United States Patent
Stern-Berkowitz et al.

(10) Patent No.: US 11,452,132 B2
(45) Date of Patent: Sep. 20, 2022

(54) TRANSMISSION ADAPTATION AND GRANT-FREE ACCESS

(71) Applicant: IDAC Holdings, Inc., Wilmington, DE (US)

(72) Inventors: Janet A. Stern-Berkowitz, Little Neck, NY (US); Moon-il Lee, Melville, NY (US); J. Patrick Tooher, Montreal (CA); Alpaslan Demir, East Meadow, NY (US); Sanjay Goyal, Deer Park, NY (US); Mihaela C. Beluri, Jericho, NY (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/610,368

(22) PCT Filed: Apr. 25, 2018

(86) PCT No.: PCT/US2018/029251
§ 371 (c)(1),
(2) Date: Nov. 1, 2019

(87) PCT Pub. No.: WO2018/204136
PCT Pub. Date: Nov. 8, 2018

(65) Prior Publication Data
US 2020/0077437 A1    Mar. 5, 2020

Related U.S. Application Data

(60) Provisional application No. 62/500,533, filed on May 3, 2017.

(51) Int. Cl.
*H04W 74/02* (2009.01)
*H04L 5/00* (2006.01)
(Continued)

(52) U.S. Cl.
CPC ........... *H04W 74/02* (2013.01); *H04L 5/0051* (2013.01); *H04W 72/044* (2013.01); *H04W 74/0808* (2013.01)

(58) Field of Classification Search
CPC ............... H04W 74/02; H04W 72/044; H04W 74/0808; H04W 72/0453; H04L 5/0051; H04B 7/0413; H04B 7/068; H04B 7/0689
See application file for complete search history.

(56) References Cited

U.S. PATENT DOCUMENTS

| 2013/0315195 A1 | 11/2013 | Ko et al. |
| 2014/0341035 A1* | 11/2014 | Bhushan ........... H04W 72/0413 370/235 |

(Continued)

FOREIGN PATENT DOCUMENTS

| RU | 2613278 C1 | 3/2017 |
| WO | 2016/106662 A1 | 7/2016 |
| WO | 2017/053738 A1 | 3/2017 |

OTHER PUBLICATIONS

3rd Generation Partnership Project (3GPP), R1-1609801, "Discussion on Grant-Free Transmission Based on Sensing", ZTE, 3GPP TSG RAN WG1 Meeting #86bis, Lisbon, Portugal, Oct. 10-14, 2016, 4 pages.

(Continued)

*Primary Examiner* — Dady Chery
(74) *Attorney, Agent, or Firm* — Flaster Greenberg, P.C.

(57) ABSTRACT

A wireless transmit receive unit (WTRU) may receive a set of candidate resources, which may be used for transmission. The WTRU may periodically perform CCA on a channel (e.g., before transmitting on the channel). When the channel is determined to be free, the WTRU may determine a resource for transmission from the candidate resources. The resource may be determined based on the time remaining in the time period. For example, when the time remaining in (Continued)

the time period is shorter, the WTRU may determine to transmit on a resource that comprises more frequency resources. The WTRU may determine a Multiple Input Multiple Output (MIMO) scheme based on the number of frequency resources. The WTRU may send a transmission on the resource, which may include a demodulation reference signal (DM-RS). The DM-RS may indicate the resource used from transmission to a receiver of the transmission.

18 Claims, 9 Drawing Sheets

(51) Int. Cl.
  *H04W 72/04* (2009.01)
  *H04W 74/08* (2009.01)

(56) References Cited

U.S. PATENT DOCUMENTS

| | | |
|---|---|---|
| 2016/0183302 A1 | 6/2016 | Chen et al. |
| 2017/0302312 A1* | 10/2017 | Guan ............... H04W 4/12 |
| 2020/0177218 A1 | 6/2020 | Guan et al. |

OTHER PUBLICATIONS

3rd Generation Partnership Project (3GPP), R1-1701594, "Basic Grant-free Transmission for URLLC", ZTE, ZTE Microelectronics, 3GPP TSG RAN WG1 Meeting #88, Athens, Greece, Feb. 13-17, 2017, 8 pages.
3rd Generation Partnership Project (3GPP), R1-1702116, "Considerations of Grant-Free Transmission of UL URLLC", Sequans, 3GPP TSG RAN WG1 Meeting #88, Athens, Greece, Feb. 13-17, 2017, 3 pages.
3rd Generation Partnership Project (3GPP), R1-1704718, "Further Discussion on Transmission Scheme 2 for DL", Intel Corporation, 3GPP TSG RAN WG1 #88bis, Spokane, USA, Mar. 3-7, 2017, pp. 1-11.
3rd Generation Partnership Project (3GPP), TS 36.212 V14.0.0, "Technical Specification Group Radio Access Network, Evolved Universal Terrestrial Radio Access (E-UTRA), Multiplexing and Channel Coding (Release 14)", Sep. 2016, pp. 1-148.
3rd Generation Partnership Project (3GPP), TS 36.213 V14.2.0, "Technical Specification Group Radio Access Network, Evolved Universal Terrestrial Radio Access (E-UTRA), Physical Layer Procedures (Release 14)", Mar. 2017, 454 pages.

* cited by examiner

TRANSMISSION ADAPTATION AND GRANT-FREE ACCESS

CROSS REFERENCE TO RELATED APPLICATIONS

This application is the National Stage entry under 35 U.S.C. § 371 of Patent Cooperation Treaty Application PCT/US2018/29251, filed Apr. 25, 2018, which claims priority from U.S. Provisional Patent Application No. 62/500,533, filed May 3, 2017, which is incorporated by reference herein in its entirety.

BACKGROUND

Mobile communications continue to evolve. A fifth generation may be referred to as 5 G. A previous (legacy) generation of mobile communication may be, for example, fourth generation (4G) long term evolution (LTE). Mobile wireless communications implement a variety of radio access technologies (RATs), such as New Radio (NR). Use cases for NR may include, for example, extreme Mobile Broadband (eMBB), Ultra High Reliability and Low Latency Communications (URLLC) and massive Machine Type Communications (mMTC).

SUMMARY

Systems, methods and instrumentalities are disclosed for transmission adaptation and grant-free access, e.g., in an unlicensed band. Flexible transmission boundaries may be provided for transmission adaptation (e.g., time periods and/or time units). Grant-free access resource pools may be provided. Unlicensed operation may be provided in a beam-based system, for example, using resource pools and or clear channel assessments (CCAs).

A wireless transmit receive unit (WTRU) may receive an indication of and/or a set of candidate resources that may be used for transmission. The WTRU may periodically perform CCA on a channel (e.g., before transmitting on the channel) to determine if the channel is free for transmission. When the channel is determined to be free, the WTRU may determine a resource (e.g., where the resource may refer to one or more time and/or frequency resources) for transmission from the candidate resources. The resource may be determined based on a time remaining in the time period. For example, when the time remaining in the time period is shorter, the WTRU may determine to transmit on a resource that comprises more frequency resources. The WTRU may determine a Multiple Input Multiple Output (MIMO) scheme based on the number of frequency resources used for transmission. The WTRU may send a transmission using the determined resource, which may include a demodulation reference signal (DM-RS). The DM-RS may indicate the resource used for transmission to a receiver of the transmission.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
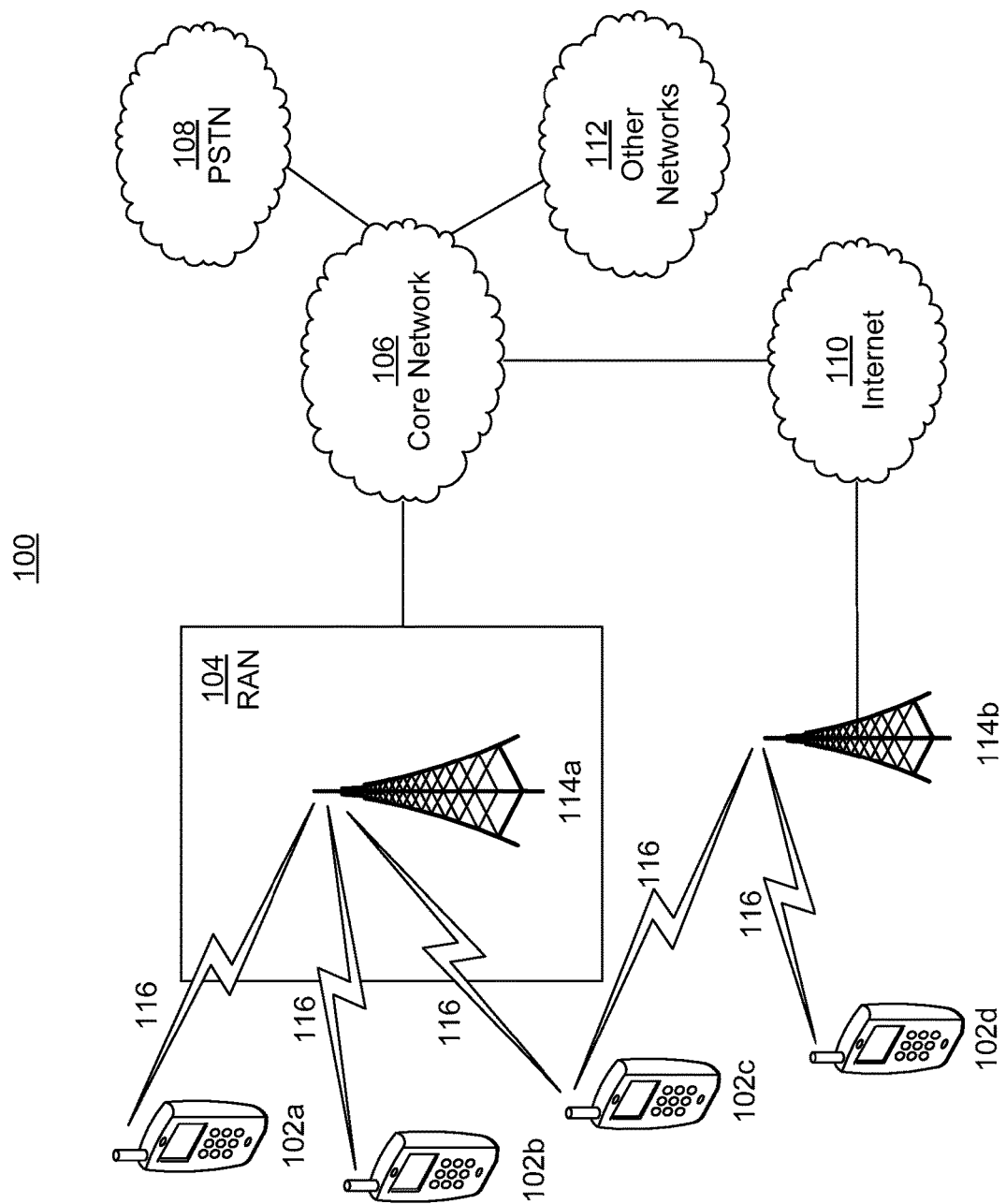
FIG. 1A is a system diagram of an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (loT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
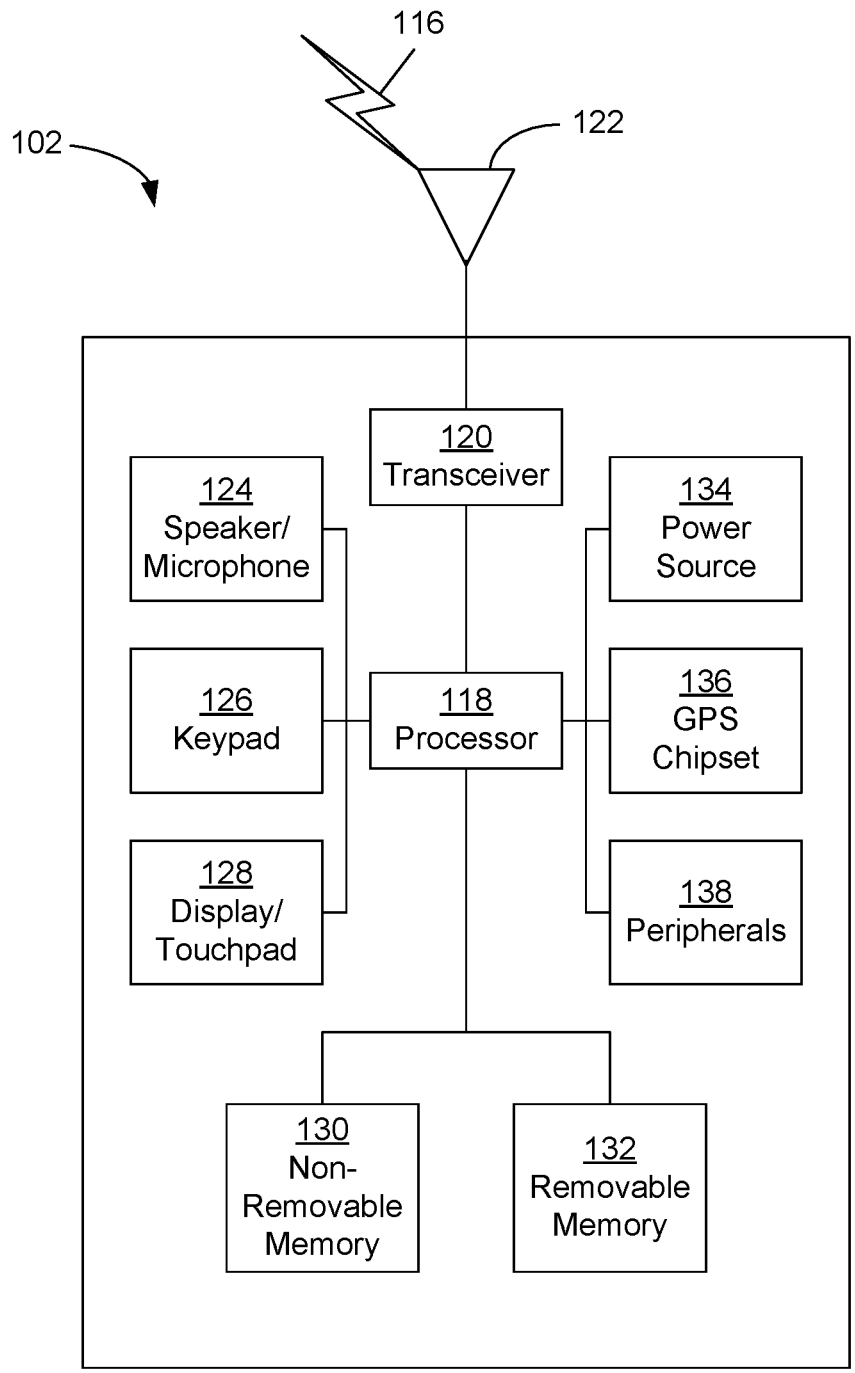
FIG. 1B is a system diagram of an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 1C:
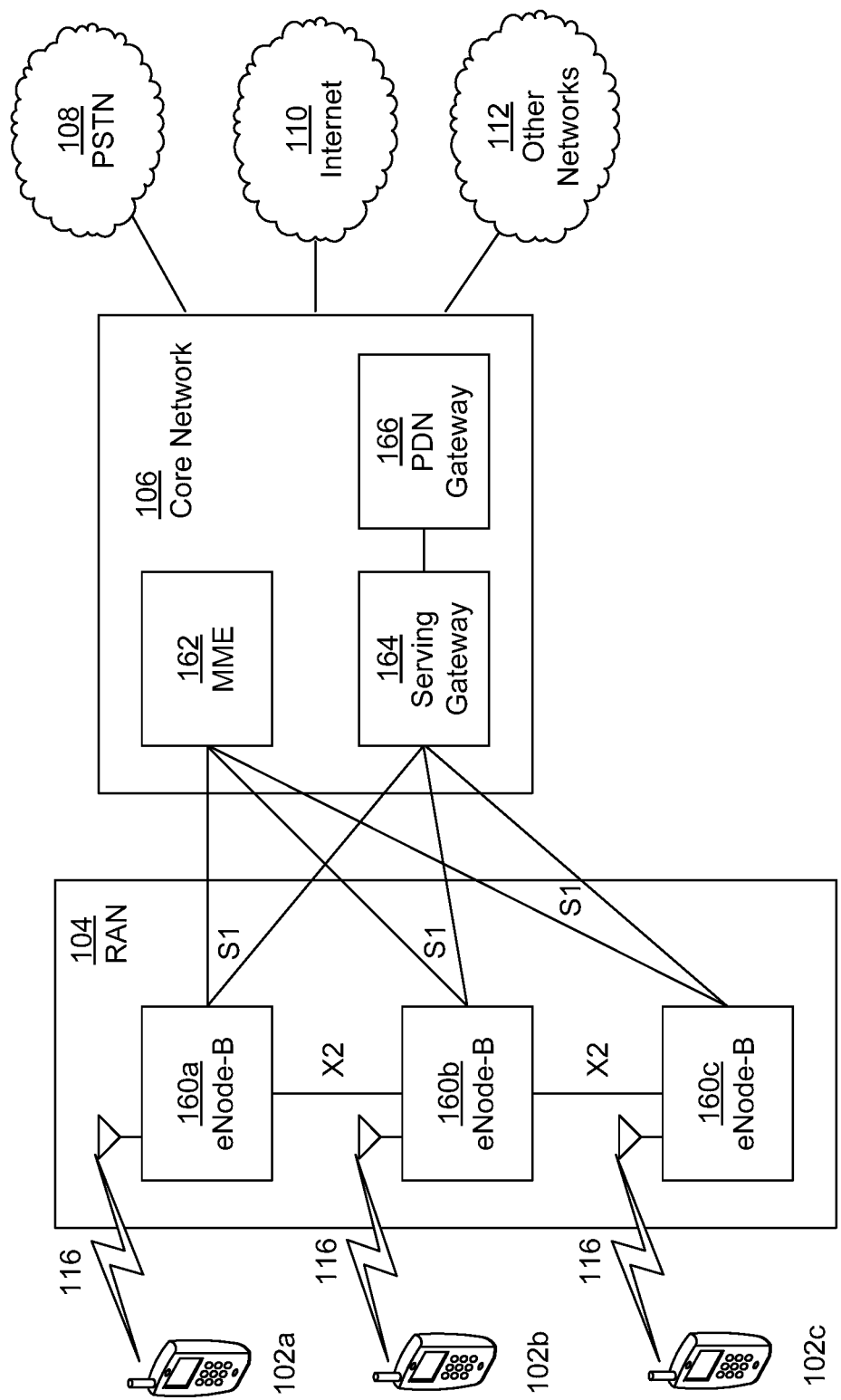
FIG. 1C is a system diagram of an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
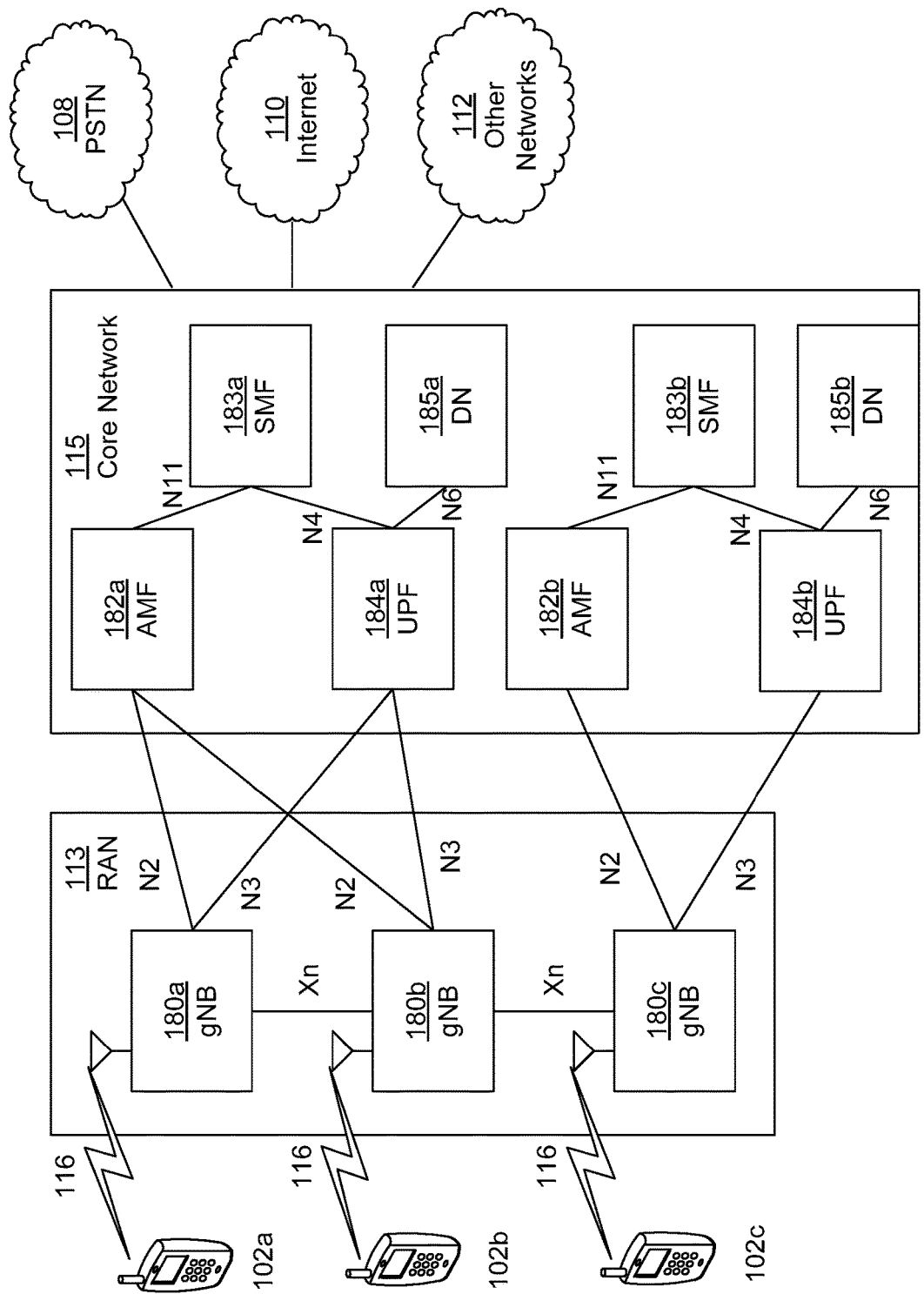
FIG. 1D is a system diagram of further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIG. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Wireless communications may support applications with varying requirements. For example, some applications may be low latency while other applications may be delay tolerant. Some applications may be high reliability while other applications may be less critical. Applications may include, for example, Enhanced mobile broadband (eMBB), machine-type communications (MTC), massive MTC (mMTC), and Ultra-reliable-and-low-latency communications (URLLC). Applications may be useful in wide range of industries, such as automotive, health, agriculture, utilities and logistics industries.

Wireless communications may be deployed using licensed spectrum and/or unlicensed spectrum. Unlicensed spectrum may be used, for example, for non-cellular services and applications such as Wi-Fi and/or cellular service (e.g., broadband data service). Unlicensed spectrum may be shared by multiple users that may interfere with each other, which may pose constraints on the use of unlicensed spectrum.

Operation or use of a cell, transmission-reception point (TRP) or carrier in an unlicensed band may be, for example, stand-alone or assisted by operation or use of a cell, TRP, or carrier in a licensed band. An assisted deployment scenario may be referred to as licensed assisted access (LAA). A licensed cell, TRP, or carrier may be a primary or anchor cell, TRP, or carrier.

Coexistence of a cellular system operation with unlicensed technologies (e.g., Wi-Fi) and cellular operators in unlicensed spectrum may be considered, for example, to minimize interference and provide for fairness among spectrum users. Mechanisms such as Listen-Before-Talk (LBT) or Clear Channel Assessment (CCA) may be used (e.g., for fair coexistence). In examples, a system node such as an Access Point (AP), eNodeB (eNB), gNodeB (gNB), TRP, user equipment (WTRU), and/or the like, may listen to a channel (e.g., a frequency band with a certain center frequency and bandwidth), for example, to determine whether another user may be using the channel before transmitting on the channel or a portion thereof. Listening and/or determination of usage by another may, for example, include or be based on measurements (e.g., energy detection).

LBT, CCA, and LBT/CCA may be used interchangeably herein. A channel may be determined to be busy, occupied, or in use, for example, when a measurement (e.g., of energy) may be at or above a threshold. A channel may be determined to be idle, free, clear, or unused, for example, when a measurement (e.g., of energy) may be at or below a threshold.

Clear, free, idle, not occupied, and not busy may be used interchangeably. Not clear, not free, not idle, occupied, and busy may be used interchangeably. Channel and operating channel may be used interchangeably. A CCA failure may mean, for example, that a channel may be (e.g., is) busy. A CCA pass may mean, for example, that a channel may be clear.

A potential transmitter on a channel (e.g., a WTRU with a potential UL transmission and/or an eNB with a potential DL transmission) may evaluate and/or monitor (e.g., receive) a channel (e.g., to measure and/or determine signal presence or interference on the channel) prior to transmission, for example, to determine whether the channel may be in use (e.g., busy and/or occupied) by another, such as another system, user, or signal.

A potential transmitter may (e.g., as part of LBT/CCA) compare a received signal and/or interference from a channel to criteria (e.g., one or more threshold levels), for example, to determine (e.g., based on the comparison) whether the channel may be free. A potential transmitter may transmit on the channel, for example, when the potential transmitter determines the channel may be free. A potential transmitter may not transmit on a channel, defer a potential transmission, and/or discard the potential transmission, for example, when a potential transmitter determines the channel may not be free.

Frame Based Equipment (FBE) may refer to equipment for which transmit/receive timing may be fixed, and/or structured. Load Based Equipment (LBE) may not perform LBT/CCA according to a certain frame structure, e.g., at fixed or defined times. LBE may perform LBT/CCA, for example, when the LBE may have data to transmit.

Equipment may refer to a node or device (e.g., a WTRU, eNB, gNB, TRP, STA, or AP) that may transmit and/or receive on a licensed and/or unlicensed channel.

An eNB may be used to refer to or represent one or more of a gNB, TRP, STA, cell, and/or AP, where eNB, gNB, TRP, STA, cell, and AP may be used interchangeably.

In examples, equipment may perform an LBT/CCA check (e.g., to detect energy on a channel), for example, before a transmission or a burst of transmissions on an operating channel.

An LBT/CCA time period for channel evaluation may be a fixed time and/or may a have a minimum time.

A Channel Occupancy Time (COT) may be a total time during which equipment may have transmissions on a given channel, e.g., without re-evaluating availability of the channel.

A Maximum COT (MCOT) may be a total time that equipment may make use of an operating channel for a given transmission or burst of transmissions.

A value of MCOT may be configured or allowed (e.g., by regulation). MCOT may be, for example, 4 ms or 10 ms.

MCOT for equipment may be less than a maximum allowed value, which may, for example, be set by a manufacturer of the equipment.

An idle Period may be a time (e.g., a consecutive period of time) during which equipment may not transmit on a channel.

An Idle Period may have a minimum (e.g., with respect to a COT, such as 5% of the COT) that may be used by equipment, e.g., for a current Fixed Frame Period.

Equipment may transmit (e.g., immediately) on a clear channel or channels, for example, when the equipment finds (e.g., during or as a result of LBT/CCA) an operating channel or channels to be clear.

Equipment may not transmit in a channel, for example, when the equipment finds (e.g., during or as a result of LBT/CCA) an operating channel is occupied. Equipment may perform a subsequent LBT/CCA, which may find the channel clear.

Equipment may not transmit on a channel (e.g., during the next Fixed Frame Period), for example, when the equipment finds (e.g., during or as a result of LBT/CCA) an operating channel occupied.

An LBT/CCA performed subsequent to an LBT/CCA that found a channel not clear may, for example, involve a wait or backoff time, e.g., before checking if the channel is clear.

An LBT/CCA that may be performed subsequent to an LBT/CCA that may have found a channel not clear may, for example, involve a longer period during which to determine whether the channel may be clear and to subsequently transmit.

A WTRU may perform CCA, for example, to determine whether a channel may be free. A WTRU may add additional backoff or wait time, such as an additional contention window amount of time, for example, when a WTRU determines a channel is not free. A WTRU may (e.g., upon determining a channel is free) check again before actual transmission, for example, when actual transmission may not begin right after a channel may be determined to be free.

In examples, a WTRU may perform CCA (e.g., for at least a check-window amount of time prior to actual transmission), for example, when the WTRU may not be within a check-window (e.g., 25 us) prior to actual transmission. A WTRU may (e.g., only) transmit, for example, when a channel may be determined to be free (e.g., for at least part of a check-window amount of time).

A CCA may be, for example, a full CCA or a short CCA. A full CCA may, for example, include adding one or more backoff times, e.g., when a channel may be determined to be busy. A short CCA may be a quick check (e.g., energy detection check), for example, in a check-window prior to the start of transmission or intended or planned transmission.

A WTRU may perform a full CCA (e.g., to determine whether a channel may be free), for example, when a WTRU may perform a CCA for a first subframe (SF) or symbol. A WTRU may perform a short CCA, for example, prior to a transmission (e.g., to re-check that a channel remains free), for example, when there may be a gap between the end of a full CCA and the start of the transmission.

Access, use of resources, or transmission on resources on a channel, in cell, to a cell, to a TRP or another node may be, for example, grant-based, allocation-based, or scheduler-based.

In examples, a WTRU may (e.g., only) transmit on a set of resources in response to or according to a received grant or allocation of resources. Resources may be, for example, time and/or frequency resources.

A grant or allocation may be (e.g., explicitly) provided, for example in DL control information (DCI). A grant or allocation may be configured (e.g., by higher layer signaling) and may be used by a WTRU, for example, when the WTRU may have data to transmit.

Access, use of resources, or transmission on resources on a channel, in cell, to a cell, to a TRP or other node may be grant-less or grant-free. Grant-less and grant-free may be used interchangeably. Resources may be, for example, time and/or frequency resources.

A WTRU may transmit on a set of resources, for example, when the WTRU may have a transmission to make. A WTRU may determine or select resources on which it may transmit, for example, from one or more configured sets of resources. The set of resources may be configured by an eNB.

Resources may be shared and/or used by multiple WTRUs. Resources may be referred to as contention-based resources. Transmissions of multiple WTRUs may collide, for example, when WTRUs may choose and/or transmit on the same resources at the same time.

Mechanisms may be included to reduce the possibility of collision. In examples, resource selection may be determined (e.g., wholly or partially) randomly. Resource selection may be a function of a WTRU-ID. Different groups of WTRUs may be configured with different sets of resources.

Mechanisms may enable a receiver of a grant-free transmission to identify a sender. In examples, a transmission may include an identifier or a partial identifier.

A WTRU may perform (e.g., in an LTE LAA UL scenario) CCA for transmission beginning, for example, on the starting boundary of a time period or on a boundary of a time unit that may be within a time period.

Examples of a time period may include, for example, a subframe (SF), a frame, a slot, a mini-slot, a set of slots or mini-slots, a TTI, a short TTI, a multi-symbol TTIs, symbol, a set of TTIs, a set of symbols, a sync burst, a sync block, a set of sync bursts or sync blocks, and the like. A time period may comprise one or more time units. Examples of a time unit may include, for example, a symbol, a slot, a mini-slot, a TTI, a short TTI, a multi-symbol TTI, a set of symbols, a sync burst, a sync block, and the like. For example, a WTRU may perform CCA (e.g., may periodically perform CCA), on a channel, at one or more of the time units comprised in a time period until the channel is determined to be free.

In examples, a WTRU may perform CCA for transmission beginning, for example, on a subframe (SF) boundary or on an indicated symbol boundary within an SF. A WTRU may receive a grant, for example, for a SF (e.g., a full or partial SF) or a set of consecutive subframes. A WTRU may perform CCA, for example, before transmission on a granted SF. A WTRU may (e.g., for a set of SFs that may be granted) perform a CCA for the next (or a later) granted SF, for example, when the WTRU may determine that the CCA fails (e.g., the channel may be busy or not idle). A WTRU may transmit on a SF and the remaining SFs in a granted set, for example, when the WTRU may determine a channel to be free for the SF in a granted SF set. Transmission may be performed without performing a CCA for subsequent SFs, for example, when transmission may be continuous. A WTRU may perform a CCA for transmission on a SF in a set after a break, for example, when there may be a break in the transmission.

A WTRU that performs CCA for transmission on specific time period boundaries, such as SF or specific symbol boundaries, may be at a disadvantage for accessing a channel with respect to another device (e.g., a WiFi device) that may not be constrained to specific boundaries for CCA or transmission.

A WTRU that may transmit based on receipt of a grant, schedule, or allocation of resources may be at a disadvantage for accessing a channel, for example, with respect to another device (e.g., a WiFi device) that may not be constrained to wait for a grant, schedule or allocation.

Systems, methods and instrumentalities are disclosed for transmission adaptation and/or grant-free access, e.g., in an unlicensed band. Flexible transmission boundaries may be provided for transmission adaptation. Grant-free access resource pools may be provided. Unlicensed operation may be provided in a beam-based system, for example, using resource pools and or CCAs.

Flexible transmission boundaries may be provided, e.g., for transmission adaptation. CCAs and transmissions may not be limited to time periods (e.g., subframes) or time units. A CCA may be repeated (e.g., at a next or other time unit), for example, when a CCA may fail for a time unit (e.g., symbol) in a time period (e.g., subframe).

Frequency resource adaptation may be provided.

Frequency resources may be adapted, for example, based on the time left in a time period for transmission. A set of frequency resources may be selected from configured candidate sets. For example, if the time remaining (e.g., one or more time units) in the time period is short, a WTRU may select a resource for transmission that comprised more frequency resources.

A MIMO scheme may be adapted, for example, based on a frequency resource set used. MIMO as described herein may refer to MIMO or massive MIMO.

A DM-RS may be used to indicate a frequency resource set used. Slot versus mini-slot use may be based on an available time to transmit and adapt a DM-RS position, e.g., based on slot, mini-slot and/or start time. A DM-RS may be placed at an end time of a transmission (e.g., in one or two last symbols). A sequence may identify a resource set used. For example, the sequence, which may be used to identify the resource set, may be signaled (e.g., signaled by an eNB) to a WTRU.

Numerology (subcarrier spacing) may be adapted, for example, based on time left in a time period for transmission.

In examples where maximum power is exceeded, for example, frequency may be limited or scaled, there may be a shift to a next or other later time period when a full amount of time may be available for transmission. TBS may be adjusted, and/or a modulation order may be selected (e.g., from a candidate set), for example, to avoid exceeding maximum power. A DM-RS may indicate which TBS and/or modulation order is used.

A beam sweeping operation (e.g., a number of beams to sweep) may be adapted, for example, based on subcarrier spacing/symbol duration and/or time left in a time period for transmission.

Data size adaptation may be provided. An amount of data to transmit may be adapted, for example, based on available time to transmit. In examples, a TBS may be adapted, codeblock segmentation may be used, and/or a number of codeblocks to be transmitted may be changed, for example, based on an available time to transmit. Multiple mini-slots may be used, for example, to enable transmission of segmented transport blocks.

Control channel adaptation may be provided, e.g., for a delayed control channel and/or short PUCCH. In examples (e.g., for delayed control channel), contents may be modified, for example, to include A/N for more DL transmissions. In examples (e.g., for a short PUCCH), coverage may be improved by repetition in time or frequency and/or a CQI may be dropped (e.g., if it will not fit). A PUCCH type (e.g., DM-RS based or sequence based) may be determined, for example, based on a time available for transmission.

Transmission time adaptation may be provided.

In examples of a start configuration, a WTRU may be configured with a set of start times or points. A WTRU may perform a CCA for a first start point. A WTRU may try a next or later start point, for example, when a first start point fails CCA.

In examples of a short transmission time, a time available for a transmission may be a function of when a transmission starts, e.g., when the end may be fixed or configured.

In examples of a fixed or configured transmission time, transmission time may be based on when a WTRU starts transmitting. A WTRU may transmit B full TBs, where B may be a number of full TBs that may fit in a time available in allocated or granted time periods, e.g., with respect to when the WTRU starts transmission. In an (e.g., alternative) example, a first or last TB may be short, for example, based on when a WTRU starts while other TBs may be full size.

Start and end time indication may be provided. In examples, a WTRU may transmit a reference signal (RS) or a control channel, for example, to indicate a start and/or an end of a transmission. An RS or control channel may use frequency resources that may be the same, e.g., regardless of a subset of frequency resources that may be used. In examples (e.g., an alternative example), an RS location may depend on a subset of frequency resources that may be used.

CCA frequency adaptation may be provided. In examples, a CCA may be performed for a band (e.g., a largest band) or set of frequencies, which may include all candidate sets of frequencies that may be used by a WTRU. A CCA may be performed on multiple subbands, for example, to enable adaptive subband set selection. A WTRU may puncture out (e.g., may not use/measure) one or more subbands, for example, when performing a CCA (e.g., to allow use of the subband by other WTRUs).

WTRU CCA capability may be provided. A WTRU may have or report a capability, for example, with respect to time granularity at which the WTRU may perform successive CCAs, which may be a function of subcarrier spacing used.

Grant-free access resource pools may be provided.

Resource pools may be configured, for example, with a schedule or pattern in time and/or frequency and with repetition (e.g., periodicity). Pools may include candidate sets of frequencies. Time resources may be relative to a reference point that may be beam-specific (e.g., sync burst or block).

Pool assignment and WTRU identification may be provided. WTRU and resource pools may be assigned to groups. A WTRU may receive a grant-free mask or RNTI, e.g., to scramble a CRC of its transmission.

Resource pool tiers may be provided. A WTRU may be configured with resource pool tiers with different resource availability (e.g., different repetition). A WTRU may transmit using resources of a second tier (with more or more frequent resources), for example, when the WTRU may not transmit using resources of a first tier (e.g., due to a channel being busy N times). Resource pools may have and/or be used for transmissions of different types or with different priorities (e.g., URLLC versus eMBB, transmission versus retransmission).

A switch may be made to grant-based transmission. A request to switch may be made, for example, by an SR or a PRACH on a licensed or unlicensed channel. A request may be made, for example, after being unable to get a channel (e.g., for one or more tiers) a threshold number of times.

Unlicensed operation may be provided in a beam-based system, for example, using resource pools and or performing CCA.

Resource Pools may be provided in a beam-based system. In examples, a resource pool may be associated with a beam or BPL. A resource pool may be configured, for example based on a DL signal to measure quality (e.g., beam discovery signal or RS). A resource pool may be in a same time resource as a sync burst or sync block of an associated beam. Another pool associated with another beam may be tried, for example, when grant-free access may fail (e.g., CCA may fail or an ACK may not be received) a threshold number (e.g., N) times.

CCA may be performed in a beam-based system. In examples, a receive beam for a CCA for a resource pool associated with a beam may be, for example, a receive beam that may be used for beam determination, a beam with the highest RSRP, or a receive beam that may be associated with a transmit beam. A WTRU may perform a CCA for one or more (e.g., all) receive beams. A WTRU may use a highest energy detected or an average energy detected. A WTRU may (e.g., before transmitting) perform a CCA again for a receive beam that may correspond to a transmit beam.

Flexible transmission boundaries may be provided and/or used.

A WTRU may perform CCA (e.g., may periodically perform CCA) for a transmission at the start of a time unit that may be within a time period. In examples, a WTRU may (e.g., when a CCA fails) try again at a later time, e.g., a later time associated with a time unit, that may be within the time period. A WTRU may continue to perform CCA on the time units comprised in the time period until the channel is determined to be free (e.g., when CCA passes). A WTRU may (e.g., when a CCA passes) transmit beginning at the later time unit.

WTRU transmission may end, for example, before or at the end of a time period. WTRU transmission may continue into the next time period.

In examples, a time period may be an SF and a time unit may be a symbol. A WTRU may determine whether a channel may be free for transmission, for example, at the start of a first symbol within a first SF. A WTRU may (e.g., when a channel is not free) determine whether a channel may be free for transmission at the start of a second symbol (e.g., a next symbol) in a first SF. A WTRU may (e.g., when a channel is free) transmit, for example, beginning with a second symbol in a first SF. A WTRU may begin transmitting a transport block (TB) in a second symbol of a first SF. The last symbol for transmission of a TB may be a symbol in a first SF, such as the last symbol or next to last symbol in the first SF. The last symbol for transmission of a TB may be a symbol in a second SF, such as a later SF, a next SF, a next adjacent SF, among other examples.

In examples, a time unit may be an sTTI. An sTTI may be comprised of a set of symbols.

A WTRU may determine a duration for a transmission, for example, based on the start point or time and/or the end point or time of the transmission. A start point or time may be determined by a WTRU, for example, based on the results of a CCA. A start point or time may be selected by a WTRU, for example, from a set of start points or times that may be configured and/or allowed. An end point or time may be fixed, configured or known. An end point or time may be selected by a WTRU, for example, from a set of end points or times that may be configured and/or allowed. A WTRU may determine a duration of a transmission, for example, from a set of durations that may be configured and/or allowed.

A WTRU may determine (e.g., based on a start point or time, an end point or time, or a duration (e.g., determined duration) of a transmission), for example: (i) an amount of data to transmit, such as a TB size (TBS), (ii) one or more frequency resources to use for transmission, and/or (iii) a set or pattern of frequency resources, such as REs, RB, or PBs, e.g., to use for transmission, and the like.

Frequency resource adaptation may be provided. A WTRU and/or an eNB or gNB may determine frequency resources of a transmission, for example, based on a start point or time and/or an end point or time of the transmission.

In examples, a WTRU may transmit on a larger set of frequency resources, for example, when there may be less time to transmit. A WTRU may determine for a transmission, for example, a start time, an end time, and/or a duration. A WTRU may determine a number of resources and/or a set of resources, for example, based on a start time, an end time, and/or a duration of a transmission.

A WTRU may use a fixed number of time and/or frequency resources to transmit a transport block. A WTRU may select a numerology, for example, based on an amount of time remaining in a transmission occasion from the moment a WTRU may have acquired a channel. In examples, a WTRU may select a first subcarrier spacing and/or a first symbol duration, for example, when a WTRU may acquire a channel in a first time instance for which there may be T1 time remaining to transmit a TB. A WTRU may select a second subcarrier spacing and/or a second symbol duration, for example, when the WTRU may fail to acquire a channel in a first time instance and (e.g., instead) acquires it at a second time instance, where, for example, there may be T2 time remaining to transmit the TB. A WTRU may (e.g., for T2 time remaining) select a larger subcarrier spacing and/or a smaller symbol duration for its transmission, for example, when T2 may be less than T1. A WTRU may be configured with a set of applicable and/or valid subcarrier spacing values and/or symbol duration values that may be used for or within an unlicensed channel. A configuration may be provided, for example, via broadcast transmission (e.g., in a system information transmission) or via configuration that may be for grant-free transmission. A configuration may be, for example, group-specific or WTRU-specific and may be provided and/or received via group-specific or WTRU-specific signaling.

A number of symbols used may, for example, be the same irrespective of the start time and/or duration. Subcarrier spacing may be determined based on start time and/or duration. In examples, a (e.g., the same) physical channel structure (e.g., reference signal structure and data RE locations) may be used for a different start time and/or duration.

A CP length may be the same for (e.g., all) subcarrier spacing candidates. A (e.g., maximum) CP length may (e.g., alternatively) be determined, for example, based on subcarrier spacing. A WTRU, an eNB, or a gNB may drop a transmission, for example, when a CP length due to a channel condition may be longer than a maximum CP length.

Resources may be time and/or frequency resources. Resources may be resource blocks (RBs) or physical resource blocks (PRBs). Resources may be, for example, consecutive (e.g., consecutive subcarriers) in frequency. Resources may be distributed in frequency, for example, across a band or sub-band of frequencies.

A set (e.g., candidate set) of RBs, PRBs, and/or frequencies (e.g., from which a WTRU may determine a subset for transmission) may be configured. In examples, a WTRU may receive one or more sets (e.g., candidate sets) of resources (e.g., patterns of resources) from which the WTRU may select a set or subset (e.g., a candidate) for transmission. A WTRU may determine a candidate from a set of candidates to use for a transmission, for example, based on a time available for the transmission.

A WTRU may map modulated symbols of a transport block (TB) to time-frequency resources (e.g., resource elements (REs)) that may correspond to a determined candidate from a set of candidates. A WTRU may apply repetition of a number of modulated symbols (e.g., a small number of symbols), for example, when a number of REs in a selected candidate may be larger than a number of modulated symbols of a TB.

In examples, unlicensed transmission in a band (e.g., 5 GHz) may involve interlaced transmission over a whole transmission sub-band (e.g., a 5 MHz or 20 MHz sub-band) within the band. Candidate sets of resources may be interlacing patterns that a WTRU may choose from. An expansion in frequency resources (e.g., a set with more frequency resources) may correspond to a denser interlacing pattern.

Use of a denser interlace may result in a WTRU having more (e.g., many more) REs available for transmission than may be necessary for a current TB. A WTRU may transmit an additional TB (e.g., with a smaller TBS) in remaining available REs.

A MIMO transmission scheme that may be used for transmission may be determined, for example, based on a (e.g., determined) frequency resource candidate and/or a start time and duration. A first MIMO transmission scheme (e.g., Space Frequency Block Coding (SFBC)) may be used, for example, when a first frequency resource candidate may be determined. A second MIMO transmission scheme (e.g., precoder cycling) may be used, for example, when a second frequency resource candidate may be determined. A first frequency resource candidate may have a smaller number of frequency resources than the second frequency resource candidate.

A MIMO transmission scheme may be determined, for example, based on a number of RBs or PRBs in a frequency resource candidate. A first MIMO transmission scheme may be used, for example, when a number of RBs or PRBs in a frequency resource candidate may be larger than a threshold, while a second MIMO transmission scheme may be used, for example, when otherwise.

A transmission rank (e.g., a number of layers) may be determined, for example, based on a (e.g., determined) frequency resource candidate and/or a start time and duration. A first transmission rank may be used, for example, when a first frequency resource candidate may be determined, while a second transmission rank may be used, for example, when a second frequency resource candidate may be determined.

A receiver may determine frequency resources used in a transmission. A WTRU may transmit a reference signal (RS), such as a demodulation reference signal (DM-RS), in its transmission. A WTRU may transmit an RS in the PRBs of a transmission (e.g., in a subset of the REs of the transmission), which may enable an eNB to determine a set (e.g., candidate set) of resources used for transmission. An eNB may use an RS transmission, for example, to determine a candidate or set of frequencies the WTRU used to transmit.

A mini-slot may be a time unit that may comprise fewer symbols than a slot. In examples, a slot may comprise 7 symbols while a mini-slot may comprise 2, 3, or 4 symbols.

A WTRU may transmit an RS in a position in a time unit (e.g., a subframe, slot, or mini-slot) where, for example, the position may be fixed, known or configured. A WTRU may transmit an RS in a position in a time unit that may be determined by the WTRU. An RS may have or may be transmitted in a position that may be, for example, a nominal, default or regular position. A WTRU may transmit an RS in a position that may not be, for example, a nominal, default or regular position. An RS transmission may be considered a flexible RS transmission, for example, when it may or may not be transmitted in a nominal, default or regular position, for example, based on one or more criteria. Criteria may be, for example, a function of when a WTRU may gain access to a channel.

A WTRU may (e.g., be configured to) use a mini-slot, for example, when it may (e.g., first) gain access to a channel. A WTRU may use a flexible RS (e.g., DM-RS) transmission, for example, when it may use a mini-slot for a (e.g., first) transmission.

An RS (e.g., DM-RS) that may be associated with a mini-slot may be used by an eNB to determine a candidate set of resources (e.g., frequency resources) in which a WTRU may be transmitted. An RS may be (e.g., may also be) used by an eNB, for example, to determine the start time of a transmission.

A WTRU may use a slot (e.g., regular slot) or mini-slot, for example, based on a time that a WTRU may gain access to a channel. In examples, a WTRU may decide to use a slot (e.g., regular slot) for transmission, for example, when the WTRU may gain access to a channel within a number of symbols, such as two symbols (e.g., OFDM or DFT-spread-OFDM (DFT-s-OFDM) symbols) from the start of a sub-frame. A subframe may comprise, for example, two slots. A WTRU may, for example, use at least one (e.g., a first) slot and may, for example, transmit in symbols of the slot occurring after the WTRU may gain access to a channel. A WTRU may transmit an RS in its nominal, regular or default location, for example when the location may be (e.g., is) included in symbols of transmission (e.g., a $4^{th}$ symbol of a slot).

In an (e.g., another) example, a WTRU may use a mini-slot for its first transmission, for example, when the WTRU may gain access to a channel after a number of symbols (e.g., 4 symbols) from the start of a sub-frame or when the WTRU may gain access to the channel after a nominal, regular, or default position of the RS. A WTRU may transmit an RS in one or more symbols of a mini-slot, for example, according to a mini-slot configuration that may be received, determined, and/or indicated.

An eNB may determine a candidate set that may be used, for example, based on the start and/or end point or time of a transmission. An eNB may blind detect a start and/or end point. An eNB may receive an indication from a WTRU, for example, to assist it in determining a start and/or end point of a transmission.

A DM-RS may be transmitted at an end time of a transmission (e.g., in one or two last symbols). Frequency resources for a DM-RS transmission may be the same, for example, regardless of a frequency resource candidate that may be determined for the transmission. In examples, a nominal bandwidth for a transmission may be used for a DM-RS transmission. A nominal bandwidth may be, for example, a frequency resource candidate that may be used for a reference start time and/or duration (e.g., time period).

One or more sequences may be used for a DM-RS. The number of sequences used may be determined, for example, based on the number of frequency resource candidates. A (e.g., each) sequence may correspond to a frequency resource candidate.

A sequence corresponding to a frequency resource candidate may be used for a transmission, for example, when an eNB, gNB, or a WTRU may determine a frequency resource candidate, e.g., based on start and duration of the transmission.

A receiver may (e.g., blindly) detect a sequence of a DM-RS transmitted at the end of a transmission, for example, to determine a frequency resource candidate used.

One or more (e.g., additional) DM-RS in frequency may be used, for example, when a determined frequency resource may be wider than a nominal frequency resource.

One or more (e.g., additional) DM-RS in time may be used, for example, when a duration may be longer than a reference duration (e.g., time period).

A DM-RS may (e.g., alternatively) be transmitted at an end time of a transmission, which may be aligned irrespective of frequency resource candidates. Frequency resources for a DM-RS may be different, for example, based on the frequency resource candidates. In examples, a DM-RS may be transmitted in frequency resources. DM-RS sequence and/or sequence length may be determined, for example, based on a determined number of frequency resources. A receiver may (e.g., blindly) detect DM-RS sequences, for example, to determine a frequency resource candidate used for a transmission.

A maximum power constraint may be provided. A WTRU may exceed a maximum power (e.g., a configured maximum output power), for example, when using additional frequency resources. A WTRU may take one or more actions, for example, to avoid violating a power constraint, such as by exceeding a maximum power or maximum EIRP.

A WTRU may (e.g., when determining a set of frequency resources to use), for example, limit candidates, e.g., to avoid exceeding a maximum power or EIRP. A WTRU may (e.g., alternatively) scale the power of one or more channels to be transmitted, e.g., to avoid exceeding maximum power or EIRP.

An eNB may (e.g., for blind decoding frequency resources) use a latest power headroom report, for example, to determine a set most likely used in a transmission.

A WTRU may determine a set of frequency resources to use for transmission. A WTRU may act as though a channel was determined to be busy and check channel availability at the start of a later (e.g., next) time period, for example, when the WTRU may use a set of frequency resources (e.g., for a short transmission) that may result in the WTRU exceeding maximum power.

In examples, a WTRU may perform a CCA for a first time unit (e.g., in a time period) for which a transmission time may be Tbase. A WTRU may use a first set of frequency resources for transmission, for example, when the WTRU may determine the channel to be free. A WTRU may try again at a second time unit (e.g., in the time period) for which the transmission time may be Tshort where Tshort<Tbase, for example, when the WTRU may determine the channel to be busy. A WTRU may use a second set of frequency resources for transmission (e.g., the second set of resources may include more resources than the first set of resources), for example, when the WTRU may determine the channel to be free.

A WTRU may skip transmission for (e.g., beginning with) a second time unit, for example, when the WTRU determines that transmission on a second set of frequency resources may (e.g., would) violate a power constraint (e.g., a maximum power or EIRP). A WTRU may, for example, try again (e.g., a CCA and a transmission when the channel is free) for a later (e.g., next) time unit in a time period or try again for a later (e.g., next) time period. A WTRU (e.g., by going to a later time period) may result in the WTRU having more time for transmission and using fewer frequency resources that may not exceed a maximum power.

A WTRU may determine that transmission on a second set of frequency resources may violate a transmission power constraint. A WTRU may (e.g., alternatively) search for (e.g., among one or more candidates) and/or determine, for example, a smaller TBS and/or a lower modulation order that may enable the WTRU to meet a transmission power constraint. A WTRU may transmit using a TBS and a modulation order. A TBS may be, for example, an original TBS or a determined smaller TBS. A modulation order may be, for example, an original modulation order or a lower modulation order. One or more candidate TBS and modulation orders may be predefined or configured. A DM-RS that may be transmitted in frequency resources may be used, for example, to indicate which TBS and/or modulation order may be used.

A time unit may be, for example, a scheduled, configured or allocated time unit. A time period may be, for example, a scheduled, configured, or allocated time period.

A WTRU may (e.g., alternatively) claim a channel, for example, for the duration of Tshort, until the start of a later (e.g., the next) time period, and/or until it may transmit for a longer period of time and/or use fewer frequency resources. A WTRU may, for example, transmit a reference signal or other signal within a first or second set of frequency resources, e.g., to claim a channel. A WTRU may transmit in a next time period (e.g., at the start of a next time period).

Beam sweeping adaptation may be provided. A WTRU may (e.g., when transmitting in an unlicensed channel or band) perform a UL Tx beam sweeping operation and/or retransmissions, for example, to enable a UL Rx beam sweeping operation. Retransmissions may comprise, for example, repetitions (e.g., of the same data). Retransmissions may comprise, for example, multiple transmissions on the same Tx beam or in the same direction. Multiple transmissions may or may not be the same (e.g., the same data). A WTRU and/or gNB may have restrictions on the number of beams that may be used simultaneously. A WTRU may repeat a transmission over multiple symbols. In examples, a WTRU may transmit a TB over a symbol and may repeat the transmission over multiple symbols (e.g., of a slot). Repetition may enable or may be used, for example, for Tx and/or Rx beam sweeping. The number of symbols of a transmission that may be part of a set of repeated transmissions may be constant. In examples, the number of symbols may be the same number for one or more (e.g., all) of the transmissions in a set of repeated transmissions.

A WTRU may select a subcarrier spacing, for example, based on the amount of time remaining in a transmission occasion or based on the time at which the WTRU may have acquired a channel. A WTRU may be configured with a set of subcarrier spacing values that may be applicable to a transmission in a channel.

An over-all transmission bandwidth may have a restriction (e.g., due to maximum power constraint). A WTRU may reduce a symbol time (e.g., increase subcarrier spacing) until achieving a maximum bandwidth. A WTRU may modify a rate at which it may repeat a transmission. In examples, a WTRU may (e.g., for a first subcarrier spacing) map a full TB to a symbol and may repeat the transmission over adjacent symbols (e.g., while changing its UL transmission beam). A WTRU may (e.g., for a second subcarrier spacing) map a full TB to a set of one or more symbols (e.g., two) and may repeat the set of symbols over adjacent symbol sets. This may reduce the number of beams with which a WTRU may sweep transmission. A WTRU may adapt a beamwidth of an (e.g., each) individual beam for which it may transmit a repetition of data, for example, to enable the WTRU to sweep over an adequate total beamwidth. An adaptation may be based on a total number of available repetitions in a transmission occasion.

Data size adaptation may be provided. In examples, a transport block size (TBS) may be adapted. A TBS may be the same for one or more (e.g., all) candidate sets of resources. A (e.g., each) candidate set of resources may (e.g., alternatively) be associated with a TBS. A WTRU may transmit on a set of resources (e.g., a set determined from candidates), for example, using an associated TBS.

A WTRU and/or eNB may determine an amount of data (e.g., TBS) of a transmission, for example, based on a start point or start time of the transmission, the endpoint or end time of the transmission, and/or the duration of the transmission. An amount of data (e.g., TBS) may be determined, for example, based on a candidate set of resources (e.g., frequency resources) used for a transmission, e.g., using the number of PRBs in the resource set used for transmission.

A WTRU may not have enough time to build or rebuild a TB before transmission, for example, when the size may change depending on when the WTRU may begin transmission.

A WTRU may prepare a set of transport blocks with sizes that may correspond to one or more possible start times, durations, and/or frequency resource sets. A WTRU may use a prepared TB that may align with a (e.g., an autonomously) determined start time, duration, and/or frequency resource set.

Code block segmentation may be used, for example, when preparing multiple TBs in advance may not be an optimal solution. The number of codeblocks to transmit may be determined, for example, based on the time available for a transmission.

In examples, a WTRU may determine a number of codeblocks to transmit, for example, based on a start point or start time of a transmission, the endpoint or end time of the transmission, and/or the duration of the transmission. The number of codeblocks may be determined and/or selected by a WTRU, for example, from a candidate set or a configured set.

A receiver (e.g., eNB) may determine the number of codeblocks transmitted, for example, based on a start point or time of a transmission, an endpoint or end time of the transmission, and/or the duration of the transmission.

A WTRU may not be able to transmit all codeblocks (CBs) of a TB in a transmission occasion (e.g., slot). A WTRU may (e.g., when a CB or CB group (CBG) retransmission may be possible) keep (e.g., all) CBs (e.g., transmitted and not transmitted) of a TB and may wait for a gNB to provide HARQ feedback (e.g., CBG-level HARQ feedback) or a CBG level UL grant, e.g., to transmit remaining CBs.

In an (e.g., alternative) example, a WTRU may adapt a TB transmission to fit into multiple (e.g., two) adjacent mini-slots (e.g., TB segmentation over multiple slots or mini-slots). A first mini-slot size may be adapted, for example, to include a first set of CBs that may be transmitted from the time a WTRU may acquire a channel until a transmission boundary. A second mini-slot size may be adapted to enable transmission of a remaining set of CBs (e.g., over a predetermined bandwidth). A second mini-slot may be transmitted, e.g., immediately, after a transmission of a first mini-slot (e.g., when MCOT may not be exceeded). A WTRU may (e.g., upon completion of transmission of a second mini-slot such as for the first TB) transmit a subsequent TB, which may be transmitted over a default, pre-configured or pre-determined slot size (e.g., when MCOT may not be exceeded). In an (e.g., alternative) example, a slot size used by a WTRU for the remainder of its channel occupancy may, for example, be a function of a slot size that may be used in the first and/or second mini-slot transmission.

In an (e.g., alternative) example, a WTRU may be configured to use a mini-slot, for example, when it (e.g., first) accesses a channel, and may fallback to using slots (e.g., regular slots) for subsequent back-to-back transmissions. A WTRU may decide to use a mini-slot or a slot, for example, based on a start point of a transmission (e.g., when a channel may be assessed as being available). A WTRU may determine the size of a mini-slot (e.g., 2, 3, 4 symbols), for example, based on a start point of a transmission.

In an (e.g., alternative) example, a WTRU may partition a TB to be transmitted into multiple (e.g., two) codewords. A WTRU may decide to transmit multiple codewords, a shorter codeword, or a longer codeword, for example, based on a start point of a transmission and/or the duration of the transmission.

A WTRU may (e.g., in a grant-based transmission) be granted UL resources to transmit another TB in a second slot. A WTRU may (e.g., in this case) pre-empt transmitting a second TB, for example, to complete transmission of a first TB, e.g., using a mini-slot. Pre-emption may lead to the second TB transmission involving segmentation into multiple (e.g., two) mini-slots and/or pre-empting a third TB transmission, and so on.

A WTRU may include DM-RS and/or another reference signal in a (e.g., each) slot, e.g., regardless of slot size, for example, when one or more TBs may be segmented across multiple mini-slots. In an (e.g., alternative) example, a WTRU may include one or more (e.g., all) reference signals in (e.g., only) one or more slots, for example, for a transmission with one or more segmented TBs. Inclusion of reference signals may be statically or semi-statically configured (e.g., in conjunction with a grant-free transmission configuration), may be determined by a WTRU, and/or may be indicated to a gNB.

Control channel adaptation may be provided. The type or size of a UL control channel (e.g., PUCCH) may be dependent on the amount of time available for transmission, for example of the PUCCH alone or combined with a PUSCH transmission. A PUCCH may be repeated in time and/or frequency, for example, to improve coverage of the PUCCH.

Resources for transmission and/or repetition of a PUCCH may be selected and/or determined from candidate resource sets that may be configured. A resource set may be selected and/or determined, for example, based on time available for transmission.

A PUCCH type may (e.g., alternatively), for example, be dependent on an amount of time available for transmission. In examples, a first PUCCH type (e.g., DM-RS based PUCCH) may be used for a first candidate resource set and a second PUCCH type (e.g., a sequence based PUCCH) may be used for a second candidate resource set. A first candidate resource set may have a longer time duration than a second candidate resource set. One or more of the following may apply. A first PUCCH type (e.g., DM-RS based PUCCH) may provide a higher multiplexing capacity while performance may be worse than a second PUCCH type (e.g., sequence based). A second PUCCH type may provide better performance while providing a lower multiplexing capacity. Candidate resource sets for a first PUCCH type and a second PUCCH type may be non-overlapped in frequency.

Content of a PUCCH transmission may change, for example, based on a delayed start of a PUCCH transmission, e.g., due to a channel being determined to be busy. In examples, a first content may be transmitted, for example, when transmission may begin with a first time unit or time period. A second content may be used, for example, when a transmission may be delayed to a second time unit or time period, e.g., due to a channel being determined to be busy for a first time unit or time period.

In examples, a second content may include ACK/NACK (A/N) information for more DL transmissions than a first content. A second content may include A/N information for more DL transmissions, for example, when a window of time covered by a delayed PUCCH may cover an A/N for more DL transmissions.

In examples, a first content may include an A/N for a first, a second, and a third DL transmission. A second content may include an A/N for a first, a second, a third and a fourth DL transmission. Fourth A/N information may be included, for example, when a delay from a first time unit or period to a second time unit or period relative to HARQ timing for DL transmission may warrant adding A/N information for another possible DL transmission.

In an (e.g., another) example, a first content may include an A/N and a CQI. A second content may include, for example, an A/N without a CQI. A CQI may be dropped, for example, based on a time available for transmission. A CQI may be dropped, for example, when there may not be room to transmit the CQI in a PUCCH, e.g., when the PUCCH may be shortened. A PUCCH may be shortened, for example, based on a time available for transmission, which may be a function of when the channel may be determined to be free for transmission.

A transmission time start point may be configured. A WTRU may be configured with a set of transmission start points that may, for example, correspond to time units or time periods. Time units may be within one or more time periods. In examples, a WTRU may be configured with a set of symbols that may be within a subframe in which the WTRU may transmit or begin transmission.

A set of time units (e.g., symbols) within a time period (e.g., subframe) at which a WTRU may begin transmission may be configured. A configuration may be provided by higher layer (e.g., RRC) signaling. A configuration may be provided in a DCI. A DCI may include a UL grant for transmission. A DCI may be a common DCI, e.g., which may be intended for or used by one or more WTRUs. A DCI may include a trigger, for example, to enable UL transmission, e.g., after grant parameters may be (e.g., separately) provided.

A WTRU may (e.g., for grant-based or grant-less access), determine that a channel may not be clear before a first start point. A WTRU may try again for one or more (e.g., each) of the next start points in a set of start points, for example, until the WTRU may determine the channel to be free for transmission. A WTRU may transmit (e.g., beginning with a start point), for example, when the WTRU may determine a channel to be free for a start point.

Transmission time may be shortened. An end of a transmission in a time period may be fixed or configured. In examples, a transmission may end in the last time unit of a time period or another configured time unit within the time period.

An amount of time available for a transmission may, for example, be a function of a start point of a transmission in a time period.

In examples, transmissions beginning at a first time unit in a time period may result in T1 time for transmission and transmission beginning at a second time unit in a time period may result in T2 time for transmission. T2 may be less than T1, for example, when the second time unit may be after the first time unit. A WTRU may have less time to transmit (e.g., T2 time instead of T1 time), for example, when a CCA may fail for the first time unit and may pass for the second time unit, with the WTRU beginning transmission for the second time unit.

Transmission time (e.g., maximum transmission time) may be fixed or configured. A transmission time may be, for example, a length of a time period, a TTI, which may be configured, or a scheduled, granted, or allocated time or TTI of the transmission.

A transmission time may begin at a time unit and the transmission time may be relative to a starting time unit, for example, when a WTRU may begin transmission at a time unit that may not be at the start of a time period. A transmission may continue in the next time period, for example, when a transmission time may be longer than a time from the time unit to the end of the time period.

A WTRU and/or eNB may determine the number of transport blocks that may be transmitted. A number of transport blocks that may be transmitted may be, for example, a function of the start point or time and/or end point or time of a transmission.

A WTRU may be allocated or granted n or a maximum of n time periods, TP1, TP2, . . . , TPn. A WTRU may perform CCA. The CCA may begin prior to TP1. A WTRU may determine a channel to be free for transmission beginning at time unit x, TUx, within time period k, TPk.

A WTRU may transmit a first transport block (TB) beginning at TUx. A WTRU may determine a number of transport blocks, B, that it may transmit. A WTRU may transmit, for example, up to B transport blocks (B<=N). In examples, B may be the number of transport blocks (e.g., full transport blocks) that may be transmitted in a time period beginning at TUx and ending at the end of TPn. A WTRU may release a channel, for example, after transmitting B transport blocks. A WTRU may release a channel before transmitting B transport blocks, for example, when the WTRU may have completed transmitting data or TBs.

A first TB may be reduced in size (e.g., such that a transmission of the first TB may fit in a first time period), for example, when the first TB transmission may (e.g., does) not begin at the beginning of a time period. Remaining TBs that may be transmitted may be full size. A first and one or more subsequent TBs may (e.g., alternatively) be full size and a last TB may be reduced in size, for example to fit in a last part of a last time period that may contain a transmission.

An amount of data a WTRU may transmit, such as a transport block size (TBS), may be a function of a start point and/or an end point of a transmission.

In examples, a WTRU may perform a CCA for transmission at the start of a symbol within an SF. A WTRU may (e.g., when a CCA may fail) try again at a later symbol that may be within an SF. A WTRU may transmit beginning at the later symbol, for example, when the WTRU may determine that a CCA passes.

A full CCA may be used, for example, when a WTRU may try again at a later time unit (e.g., symbol). A full CCA may not be a new CCA. A full CCA may be a continuation of a full CCA that may have been performed prior to a previous time unit (e.g., symbol). In examples, a WTRU may perform a (e.g., full) CCA and may begin transmission at a first symbol in granted or allocated time resources following a determination that a channel may be free.

An indication may be provided of start and/or end times, which may, for example, be detected by blind decoding. An eNB may use blind decoding or assistance from a WTRU transmission, for example, to receive and/or decode a transmission that may have one or more flexible boundaries or patterns in time and/or frequency.

In examples, an eNB may determine (e.g., based on blind detection) a start and/or end of a transmission that it may receive. Blind detection may comprise, for example, attempting to receive and/or decode one or more candidate transmission sizes. A transmission may be considered successfully received and/or decoded, for example, when a CRC may be determined to be correct. A transmission size may comprise, for example, a number of time units and or time periods. Candidates may include time and frequency components, for example, for transmissions in which a number and/or pattern of frequency resources may be adapted, e.g., based on length of a transmission in time.

A WTRU may provide an indication and/or assistance. In examples, a reference signal may be transmitted and/or used to indicate a start and/or end of a transmission.

In examples, a WTRU may transmit a first reference signal, e.g., to indicate the start of a transmission. A WTRU may, for example, transmit a reference signal in at least one time unit of a transmission. In examples, a reference signal may be transmitted in (e.g., at least) a first time unit of a transmission.

A WTRU may transmit a second reference signal, for example, to indicate an end of a transmission. A WTRU may transmit a reference signal in a (e.g., at least one) time unit of a transmission. In examples, a reference signal may be transmitted in (e.g., at least) a last time unit of a transmission.

A WTRU may transmit a first and/or a second reference signal for a transmission. First and second reference signals may be the same or different.

A start, such as a start time of a transmission (e.g., a starting time unit or time period), may be, for example, one of a set of starts that may be configured. A start time may be a starting time unit within a time period.

An end, such as the end time of a transmission (e.g., an ending time unit or time period), may be one of a set of ends that may be configured. An end time may be an ending time unit within a time period.

A reference signal may be transmitted in a bandwidth or pattern that may be present independent of a subset selected or used, for example, when frequency resources that may be used for transmission may be a determined subset from among a set of frequency resources.

A reference signal may (e.g., alternatively) be transmitted, e.g., repeated, across a bandwidth or pattern of a subset of frequency resources that may be used for a transmission.

In examples, a first subset may include a set or pattern of F1 frequency resources and a second subset may include a set or pattern of F2 frequency resources. F1 resources may be a subset of F2 resources. A WTRU may transmit a reference signal within F1 resources, for example, when transmitting using F1 resources. A WTRU may transmit a reference signal within F1 resources, for example, when transmitting using F2 resources. In an (e.g., alternative) example, a WTRU may not transmit a reference signal within resources that may be in F2 but may not be in F1, for example, when transmitting using F2 resources. In an (e.g., alternative) example, a WTRU may transmit a reference signal within resources that may be in F2 but may not be in F1, for example, when transmitting using F2 resources. A transmission may be a repeat or extension of a transmission within F1 resources.

Transmission of a reference signal within a set or pattern of resources (e.g., F1 or F2) may be within a subset of the resources, for example, in a set of REs within the resources or RBs.

A reference signal that may be used to indicate a time reference may be referred to as a time reference signal (TRS).

A WTRU may include a control channel, e.g., at the start of a transmission. A control channel may, for example, include an indication of a length or duration of a transmission (e.g., in time).

A location of a control channel in frequency may, for example, be based on the smallest set of frequency resources that may be used for a transmission.

In examples, a control channel may be transmitted in a bandwidth or pattern that may be present independent of a subset selected or used, for example, when frequency resources that may be used for transmission may be a determined subset from among a set of frequency resources.

A control channel may (e.g., also) indicate a set of frequency resources that may be used (e.g., a candidate set selected from among configured sets of candidates).

A WTRU may make or perform a measurement that may be an energy detection measurement, for example, when performing a channel assessment, e.g., to determine whether a channel may be clear. An energy detection or measurement may be performed over a band or set of frequencies that may include one or more (e.g., all) candidate frequency sets. A WTRU may compare a measurement or a detected energy with a threshold, for example, to determine whether a channel may be free or busy.

A candidate frequency set may be a subset of another candidate frequency set. A frequency set may, for example, include one or more (e.g., all) other candidate frequency sets. The largest frequency set may include, for example, one or more (e.g., all) other candidate frequency sets.

A WTRU may perform a channel assessment for a band or set of frequency resources that may be or may include the largest frequency set.

A band or set of frequencies or frequency resources for which a WTRU may perform a CCA may be larger than a band or set of frequencies or frequency resources on which the WTRU may transmit.

A WTRU (e.g., at the time it may perform a CCA) may not know on what frequencies the WTRU may (e.g., will) transmit. In examples, a WTRU may perform a CCA for a first time unit for which there may be T1 time to transmit. A WTRU may (e.g., for T1 time) transmit on resource set R1. A WTRU may determine whether a channel is free for transmission at a second time unit, for example, when CCA fails at a first time unit (e.g., when the WTRU may determine a channel to be busy). There may be T2 time to transmit (e.g., where T2 may be less than T1), for example, for a transmission that may start at a second time unit. A WTRU may (e.g., for T2 time) transmit on resource set R2. R2 may comprise more frequency resources than R1. R2 may span more frequencies than R1. R1 plus R2 may span more frequencies than R1.

A WTRU may perform a CCA for a band or set of frequencies that may, for example, include at least frequency resources in set R1 and set R2, e.g., to ensure CCA backoff/wait times may be (e.g., are) adhered to.

In an (e.g., alternative) example, a WTRU may perform multiple energy detection measurements over a band or set of frequencies that may include one or more candidate frequency sets. A (e.g., each of) multiple energy detection measurements may be for a subset of a band. In examples, subsets may overlap and may not be orthogonal. In an (e.g., another) example, a (e.g., each) subset may be disjointed and/or the set of all subsets may comprise the entire band.

A WTRU may determine channel assessment values per transmission bandwidth (e.g., at any time) to transmit, for example, based on measurements over subsets of a band and a (e.g., required) transmission bandwidth. In examples, a band may be segmented into n subbands, on which a WTRU may obtain n energy detection measurements. A WTRU may perform a CCA, for example, by obtaining n energy detection measurements on n subbands for a first time instance for which there may be T1 time to transmit. A WTRU may (e.g., for such a transmission) require resource set R1. A WTRU may search over one or more (e.g., all) combinations of n subbands, which may compose R1 resources, for example, to determine whether any combination of subbands may satisfy a clear channel assessment. A WTRU may restrict a search, for example, to adjacent sets of subbands forming R1. A WTRU may (e.g., alternatively) restrict a search, for example, to non-adjacent sets of subbands forming R1. A WTRU may (e.g., when a CCA may fail) attempt a CCA by (e.g., again) obtaining n energy detection measurements on n subbands for a second time instance for which there may be T2 time to transmit and for which a transmission may use resource set R2. A WTRU may search over one or more (e.g., all) combinations of n subbands that may comprise R2 resources, for example, to determine whether any combination of subbands may satisfy a clear channel assessment.

A WTRU may be configured to puncture out (e.g., not use or not measure) one or more subbands, for example, when the WTRU may perform a CCA. A subband may be allocated or used for other WTRUs or types of WTRU. In examples, $N_{DL}$ PRBs may be used, determined, or configured for an unlicensed spectrum. A subset of $N_{DL}$ PRBs may be excluded from an energy detection. Subbands or PRBs to exclude may be configured.

A subset of PRBs that may be punctured out from a CCA may be configured (e.g., via a higher layer signaling) or determined (e.g., based on a time period number, time unit number, cell-ID, and/or number PRBs).

A subset of PRBs that may be punctured out from a CCA may not be used for a transmission. In examples, a WTRU may not send a signal in a subset of PRBs, for example, when a WTRU may be scheduled for an uplink transmission and one or more scheduled PRBs may be overlapped with a subset of PRBs that may be punctured out from a CCA.

An energy threshold to determine whether a channel may be occupied or not may, for example, be based on the number of PRBs that may be punctured out from a CCA. In examples, an offset may be used for an energy threshold. An offset may be determined, for example, based on a number of PRBs that may be punctured out from a CCA.

A maximum allowed transmission power may be determined, for example, based on a number of PRBs that may be punctured out from a CCA.

A WTRU may perform CCA for one or more sets of frequencies. A (e.g., each) set of frequencies may be configured with a numerology, waveform, and/or transmission scheme.

A (e.g., each) set of frequencies may be configured with an energy threshold for a CCA. An energy threshold may be dependent on a waveform that may be used in a set of frequencies.

A WTRU's CCA capability may provide for flexible transmission boundaries. WTRUs may have different capabilities for performing CCA. A WTRU may have and/or report a capability, e.g., with respect to a time granularity at which a WTRU may perform one or more (e.g., successive) CCAs.

A WTRU may have, provide, and/or report (e.g., to an eNB) its capability to perform CCA. A capability may indicate, for example, how often and/or on what time boundaries a WTRU may or may be capable of performing a CCA, e.g., in terms of time units or time periods.

In examples, a WTRU may or may be capable of performing a CCA for (e.g., starting transmission on) time unit boundaries or time period boundaries.

A WTRU may or may be capable of performing a CCA for adjacent or consecutive time unit boundaries. A WTRU may not or may not be capable of performing a CCA for adjacent or consecutive time unit boundaries.

A WTRU that may not be capable of performing a CCA for adjacent or consecutive time unit boundaries may perform a CCA, e.g., once per time period. In examples, a WTRU may not try again until another or a next time period (e.g., for a time unit of another or a next time period), for example, when the WTRU may determine that a channel may not be clear during a time period (e.g., for a time unit of a time period).

A WTRU that may (e.g., only) support a CCA for time periods may or may (e.g., only) be scheduled to perform a CCA for a time period (e.g., SF) and not for time units (e.g., slots or symbols), for example, for a grant-based transmission.

A WTRU that may (e.g., only) support a CCA for time periods may (e.g., only) perform a CCA for time periods (e.g., for one time unit per time period, such as for one symbol position per time period or SF), for example, for a grant-free transmission.

Performing CCA for time periods instead of time units may delay transmission, but may enable a WTRU to sleep longer.

A time granularity at which a WTRU may perform a CCA may, for example, depend on a numerology of an expected transmission. In examples, it may be unnecessarily costly for a WTRU that may be transmitting with a large subcarrier spacing to perform a CCA on adjacent or consecutive symbols. A WTRU may be configured with a time granularity that may be dependent on a subcarrier spacing of an intended transmission or on a default subcarrier spacing for a channel. A configuration may be provided, for example, via broadcast transmission (e.g., in a system information block) or via a group-dedicated or WTRU-dedicated configuration.

A determination may be made whether a channel may be clear for transmission at a time boundary. A WTRU may perform a CCA, for example, beginning and/or for multiple time units and/or time periods prior to the time boundary, e.g., to satisfy CCA requirements.

A configuration may be provided, for example, by a network node or element, such as an eNB, gNB, TRP, and/or cell, among others. A WTRU may receive a configuration from a network node. A WTRU may receive a configuration, for example, via higher layer (e.g., RRC) signaling or broadcast signaling. A WTRU may receive a configuration, for example, via physical layer signaling, such as in a DCI. A configuration may be specific to a WTRU, a cell, a TRP, a beam, and/or a group of beams, among others.

Grant-free access resource pools may be provided. Resource pools may, for example, be used for grant-free transmission. A resource pool may be a set of resources (e.g., time and/or frequency resources) that may be used by one or more WTRUs for transmission. A WTRU may determine or select a subset of resources, for example, from a resource pool to use for transmission.

One or more resource pools may be configured and/or used for grant-free transmission by one or more WTRUs. A WTRU may receive a configuration of a resource pool that the WTRU may use for grant-free transmission.

A WTRU may perform a CCA for a subset of resources from a resource pool, for example, when the WTRU may use the subset of resources. A WTRU may (e.g., alternatively) perform a CCA per resource pool, for example, when the WTRU may be configured with one or more resource pools.

A resource pool may be configured, e.g., with a time schedule or pattern. A schedule or pattern may be periodic. A schedule or pattern may consist of a set of time units and/or time periods, e.g., consecutive time units, consecutive time periods, and/or a pattern of time units and/or time periods that may be repeated. A set of time units may be within a time period. A time unit, set of time units, or time period may be relative to a reference point that may be beam-specific. In examples, a reference point may be a start or end of a sync burst (e.g., SS burst) or a sync block (e.g., SS block) that may be within a sync burst.

A repetition may be periodic. The repetition may have a duration after which a repetition may end. A repetition may continue, for example, until a further configuration may indicate that the repetition may (e.g., will) end or may no longer be used.

A resource pool that may be configured with a time schedule or pattern may be referred to as a semi-persistent scheduling (SPS) configuration.

A resource pool may be configured with one or more sets of resources that may include time and/or frequency resources. Resources may be resource blocks (RBs) or physical resource blocks (PRBs). Resources may be consecutive (e.g., consecutive subcarriers) in frequency. Resources may be distributed in frequency, for example, across a band or sub-band of frequencies.

Use of SPS may imply that some resources may be dedicated to UL and may not be used for DL. This implication may not apply, for example, in scenarios using a CCA. An eNB that may perform a DL transmission may perform a CCA, for example, prior to the start of a time unit or time period (e.g., SF) in which there may be SPS resources configured. An eNB may take or use a channel for DL transmission, for example, when a CCA passes. A WTRU may see a channel busy and not transmit in the UL, for example, when a WTRU CCA occurs a sufficient time after an eNB may begin transmitting.

A WTRU may adjust its UL timing, for example, based on received DL timing. A WTRU may (e.g., for transmission of a time unit or time period in UL) transmit a timing advance (TA) value before a corresponding received time unit or time period.

An eNB may consider cell size and/or TA, for example, when determining when to perform a CCA and when to begin transmitting.

In examples, a cell size of 10 km may correspond to a timing advance on the order of 67 us. A symbol may correspond to, for example, on the order of 67 us. An eNB may perform a CCA, for example, to begin transmitting at least a symbol before the start of a resource pool, e.g., to enable WTRUs in the cell (e.g., including WTRUs at cell edge) to see channel busy before the start of the resource pool.

A resource pool may be configured with a frequency resource (e.g., set of RBs or PRBs) in a time unit or a time period. One or more frequency resources may be used for one or more resource pools. A frequency resource for a resource pool may be orthogonal to a frequency resource for another resource pool. A frequency resource for a resource pool may be partially or fully overlapped with a frequency resource for another resource pool.

A set of frequency resources may be configured for grant-free access. A frequency resource from a configured set of frequency resources for a resource pool may be determined based on, for example, a resource pool ID, cell-ID, time unit number, and/or time period number.

A frequency resource for a resource pool may be changed from a first time resource to second time resource (e.g., time unit, time period, or slot).

A WTRU may perform a CCA of a frequency resource associated with a resource pool. A frequency resource may be changed based on, for example, a time unit number, time period number, and/or slot number.

Resource pool assignment and WTRU identification may be provided. In examples, one or more resource pools may be configured and/or used.

A resource pool may be configured for a group of WTRUs. A WTRU may be configured with or assigned a group and/or resource pool. An eNB may perform grouping. An eNB may inform a WTRU of a group it may be in. In examples, a WTRU may be configured with the group it may be in. A configuration may include a group ID. A WTRU may determine a resource pool to use, for example, based on its group or group ID.

A WTRU may be configured (e.g., assigned a means) to indicate its identity in its transmission. An indication of identity may be used within a group. In examples, a first indication that may be used by a WTRU to identify itself in a first group may be used by a second WTRU to identify itself in a second group. WTRUs may be distinguished by an eNB, for example, based on a resource pool used by a WTRU for transmission.

A WTRU may use a CRC mask, for example, to identify itself when it transmits. A mask may be configured by an eNB. A WTRU may mask (e.g., scramble) a CRC of its transmission with a mask. A mask may be, for example, an RNTI. A mask may be a WTRU's C-RNTI or a portion or function of a WTRU's C-RNTI. A mask may be received or configured, e.g., separately from a WTRU's C-RNTI.

In examples, a WTRU may receive a first RNTI for granted access (e.g., its C-RNTI) and a second RNTI for grant-free access. A mask or RNTI for grant-free access may be a different number of bits than an RNTI or CRC mask for granted transmission. In examples, an RNTI for a granted transmission may be used to mask a CRC of a DCI that may be intended for a WTRU, for example, to provide a grant.

A WTRU may (e.g., alternatively) use a CRC mask to identify whether the WTRU buffer may be empty or not empty. In examples, a first CRC mask may be used (e.g., when a transmission may be the last transmission) and a second CRC mask may be used (e.g., when there may be a subsequent transmission).

A WTRU may, for example, use a WTRU-specific scrambling ID, e.g., for a DM-RS sequence. In examples, a DM-RS sequence may be scrambled, for example, based on a WTRU-ID. An eNB (or gNB) may (e.g., blindly) detect a DM-RS sequence, e.g., to identify a WTRU.

Resource pool tiers may be provided. There may be sets of resource pools, e.g., SPS configured resource pools. Sets of resource pools may have different frequencies of occurrence or repetition. A first tier resource pool, e.g., Tier-1, may occur less often than a second tier resource pool, e.g., Tier-2.

In examples, a Tier-1 resource pool may have a first occurrence or repetition frequency (e.g., every N1 time periods). A Tier-2 resource pool may have a second occurrence or repetition frequency (e.g., every N2 time periods). In examples, Tier-1 resources may occur or repeat less often than Tier-2 resources. In examples, N2 may be less than N1 (e.g., the second tier of resources may repeat more often than the first tier of resources).

Selection or use of a first tier resource pool or a second tier resource for transmission may be based on, for example, an availability of a channel. In examples, a WTRU may (e.g., first) try to use one or more resources in a first tier resource pool. A WTRU may use or try to use one or more resources of a second tier resource pool, for example, when a WTRU may determine a channel may be busy (e.g., for more than a threshold number of times when trying to use a first resource pool).

In examples, a WTRU may begin with a first tier resource pool, e.g., Tier-1. A WTRU may determine an upcoming Tier-1 resource occurrence or allocation in which the WTRU may transmit. An upcoming resource occurrence or allocation may comprise a set of time units and/or time periods (e.g., n time periods). A WTRU may perform a CCA, e.g., prior to a first time period. A WTRU may determine whether a channel may be free for transmission in a first time period. A WTRU may transmit in (e.g., at least) resources in a first time period, for example, when a channel may be free. A WTRU may (e.g., when a channel may not be free) determine whether a channel may be free for one or more subsequent n-1 time periods in a resource occurrence or allocation. A WTRU may transmit, for example, beginning with a first time period for which it may determine a channel to be free.

A WTRU may (e.g., when the channel may be busy for all time periods) try again at a later (e.g., the next) occurrence of a resource pool.

A WTRU may be unable to transmit for a threshold number N tries using a first tier resource pool, for example, based on a determination that a channel may be busy. A WTRU may try to transmit using resources in a second tier resource pool, e.g., more frequent resource pool. N may be a number of occurrences of a first tier resource pool. N may be a number of time units or time periods. The value of N may be configured.

One or more resource pools or sets of resource pools may be configured and/or used. A resource pool or a set of resource pools may be configured with a priority. Different resource pools or sets of resource pools may have or may be configured with a different priority. In examples, a first tier resource pool, e.g., Tier 1, may have or may be configured with a higher priority than a second tier resource pool, e.g., Tier-2. A WTRU may (e.g., decide to) use a resource pool for transmission, for example, based on a priority or type of a transmission.

In examples, a first tier resource pool may be used for higher priority data or signal types (e.g., UCI, URLLC) while a second tier resource pool may be used for lower priority data or signal types (e.g., data, eMBB, mMTC).

In examples, a first tier resource pool may be used for a re-transmission of a data channel while a second tier resource pool may be used for an initial transmission, or vice-versa, for example.

A WTRU may transmit signals in multiple resource pools (e.g., when uplink transmission power is not limited), for example, when a WTRU may be configured, determined, or indicated to transmit signals in a first tier resource pool and a second tier resource pool. A WTRU may drop or scale down a signal for a second tier (e.g., lower priority) resource pool, for example, when uplink transmission power may be (e.g., is) limited.

A first tier resource pool may be configured with a lower energy detection threshold than an energy detection threshold for a second tier resource pool, or vice versa. In examples, an offset for an energy detection threshold for a second tier resource pool may be provided, for example, with respect to an energy detection threshold for a first tier resource pool.

Figure 2:
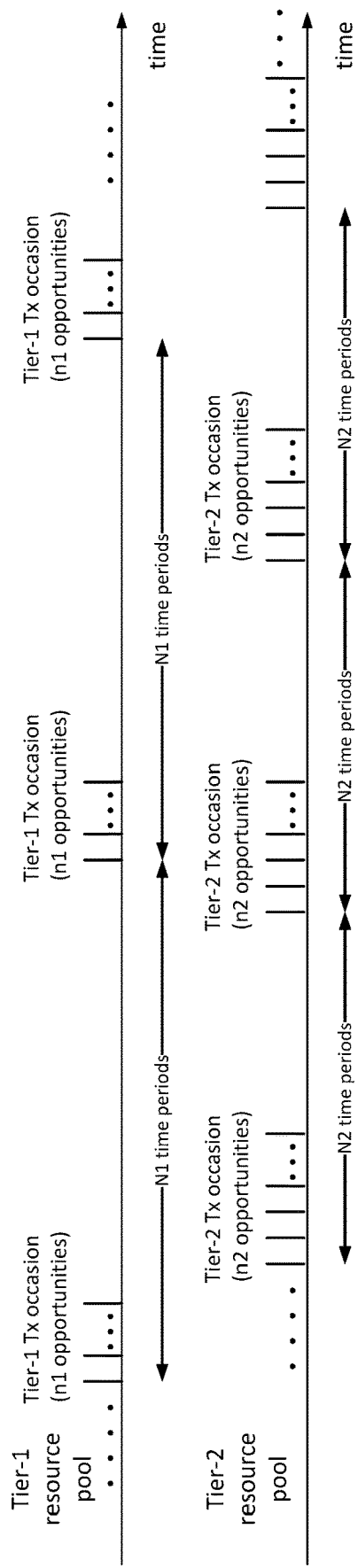
FIG. 2 is an example associated with resource pool tiers.

FIG. 2 is an example of resource pool tiers. A Tier-1 resource pool may comprise, for example, a set of n1 opportunities (e.g., every N1 time periods). A Tier-2 resource pool may comprise, for example, a set of n2 opportunities (e.g., every N2 time periods). A value of N2 may be smaller than a value of N1. Values of N1 and N2 may or may not be the same. An opportunity may be a transmission opportunity. An opportunity may comprise, for example, a set of time and/or frequency resources (e.g., RBs or PRBs). A transmission occasion may comprise a set of transmission opportunities. Transmission occasions of a resource pool may occur regularly or periodically. In examples, transmission occasions of a Tier-1 resource pool may occur every N1 time periods. Transmission occasions of a Tier-2 resource pool may occur every N2 time periods.

Opportunities within a transmission occasion or within a set of opportunities may or may not be adjacent or consecutive in time. An opportunity may correspond to one or more time units and/or time periods. Opportunities within a transmission occasion or within a set of opportunities may or may not correspond to the same duration or amount of time. A WTRU may perform a CCA at the start of an opportunity, at one or more later times during an opportunity, at the start of an occasion, and/or at one or more later times during an occasion. An occasion may comprise, for example, an opportunity and/or an occasion. An opportunity and an occasion may be the same.

Figure 3:
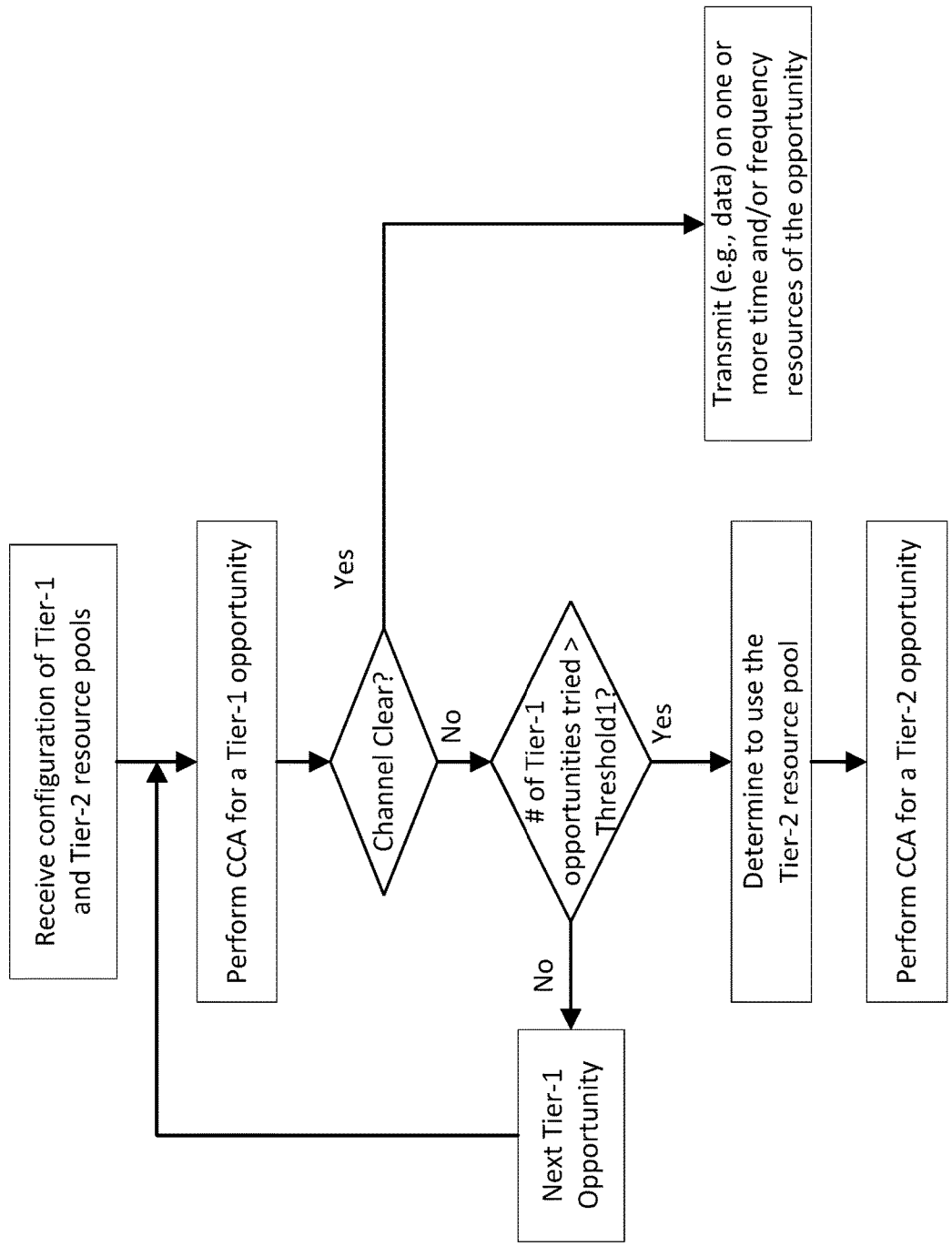
FIG. 3 is an example associated with resource pool tier selection and usage.

FIG. 3 is an example of resource pool tier selection and usage. In the example, a WTRU may (e.g., decide to) attempt to use a second resource pool tier, for example, when the WTRU may determine that it may have failed to find a channel to be clear for a number of opportunities of a first resource pool tier.

Figure 4:
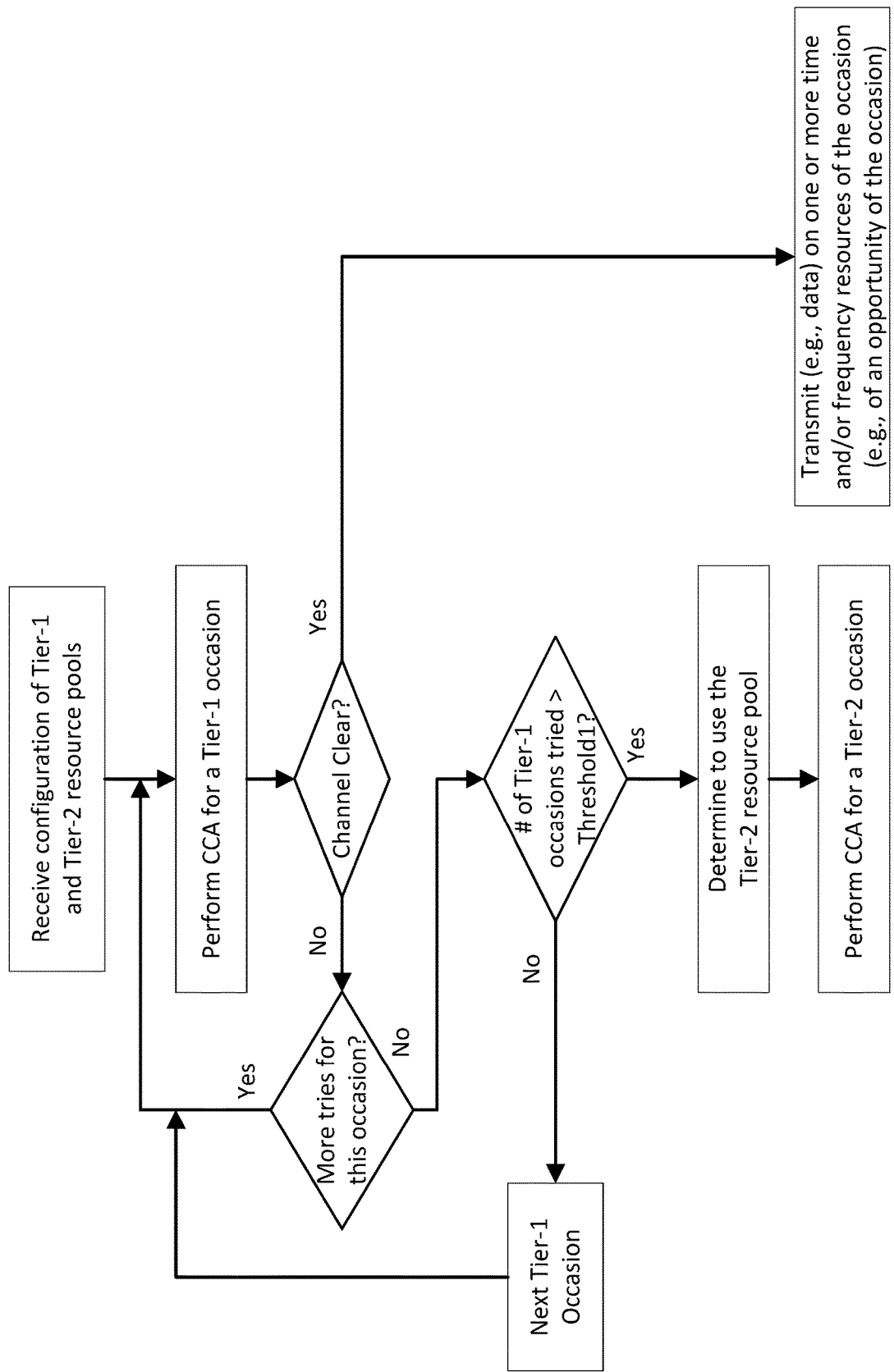
FIG. 4 is an example associated with resource pool tier selection and usage.

FIG. 4 is an example of resource pool tier selection and usage. A WTRU may (e.g., decide to) attempt to use a second resource pool tier, for example, when the WTRU may determine that it may have failed to find a channel to be clear for a number of occasions of a first resource pool tier.

Switching to grant-based access may be provided. A WTRU may request grant-based resources and/or licensed resources, for example, when the WTRU may be unable to transmit using (e.g., Tier-1 and/or Tier-2) grant-free resources (e.g., due to a determination that a channel may be busy). A WTRU may make a request, for example, when the WTRU may be unable to transmit using grant-free resources for a threshold number of tries. A number of tries may comprise, for example, a number of Tier-1 tries and/or a number of Tier-2 tries.

A WTRU may request grant-based resources and/or licensed resources, for example, by transmitting: (i) a scheduling request (SR) on a licensed channel (e.g., on a PCell); (ii) an SR on an unlicensed channel and/or (iii) a PRACH on a licensed or unlicensed channel.

An SR may be transmitted on allocated resources (e.g., resources allocated for a PUCCH channel).

Resource pools may not occur often, for example, for some types of communication (e.g., MTC). In examples, a resource pool may occur a few times a day. In examples, a resource pool may occur for a pattern of time periods that may occur one or more times a day.

A WTRU may use PRACH resources, which may occur (e.g., much) more frequently, for example, when a WTRU may fail to use grant-free resources after a number of tries.

Figure 5:
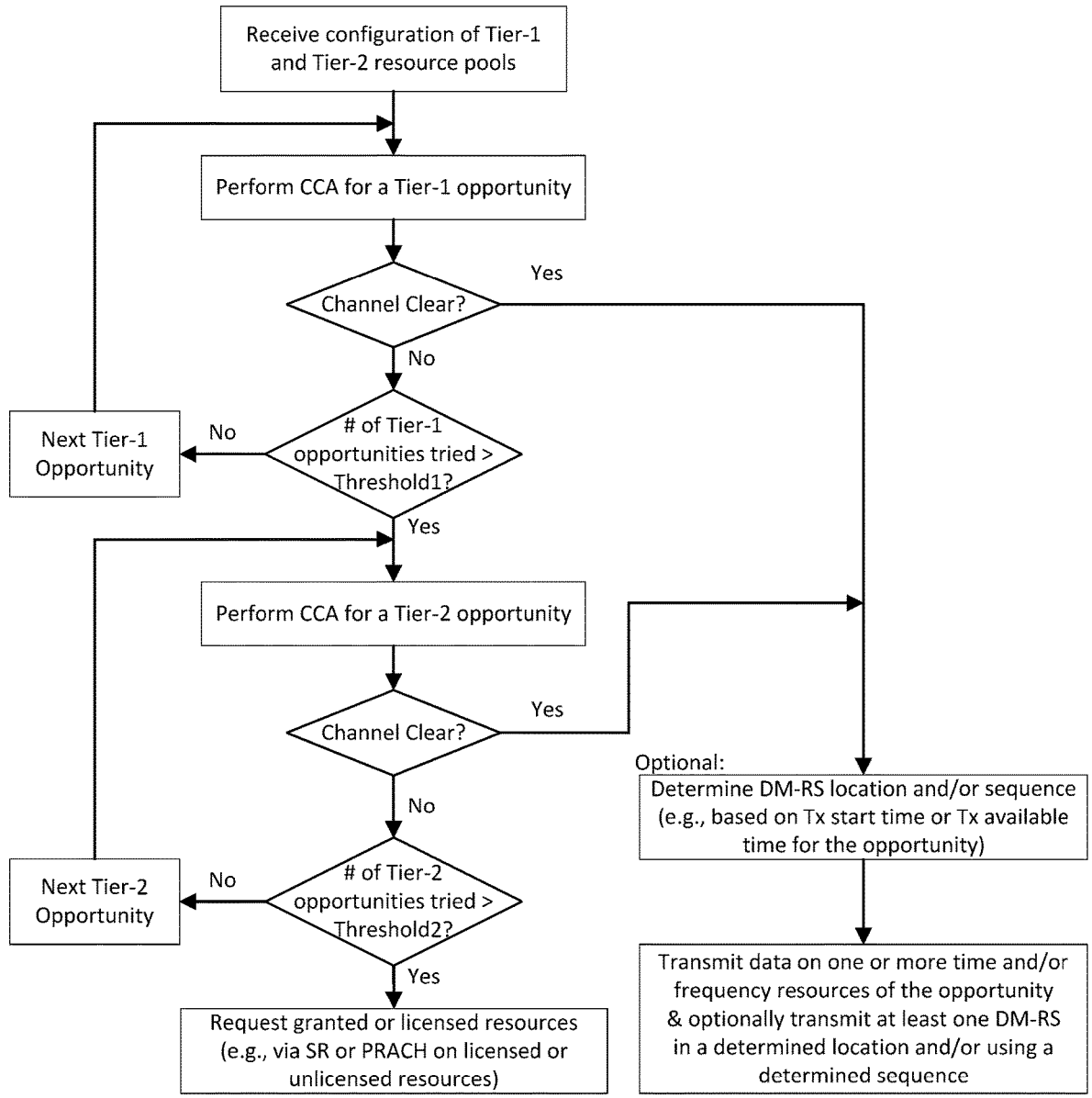
FIG. 5 is an example associated with resource pool tier selection and usage.

FIG. 5 is an example of resource pool tier selection and usage. A WTRU may (e.g., decide to) attempt to use a second resource pool tier, for example, when the WTRU may determine that it may have failed to find a channel to be clear for a number of opportunities of a first resource pool tier. A WTRU may (e.g., decide to) request granted or licensed resources, for example, when the WTRU may determine that it may have failed to find a channel to be clear for a number of opportunities of a second resource pool tier.

Figure 6:
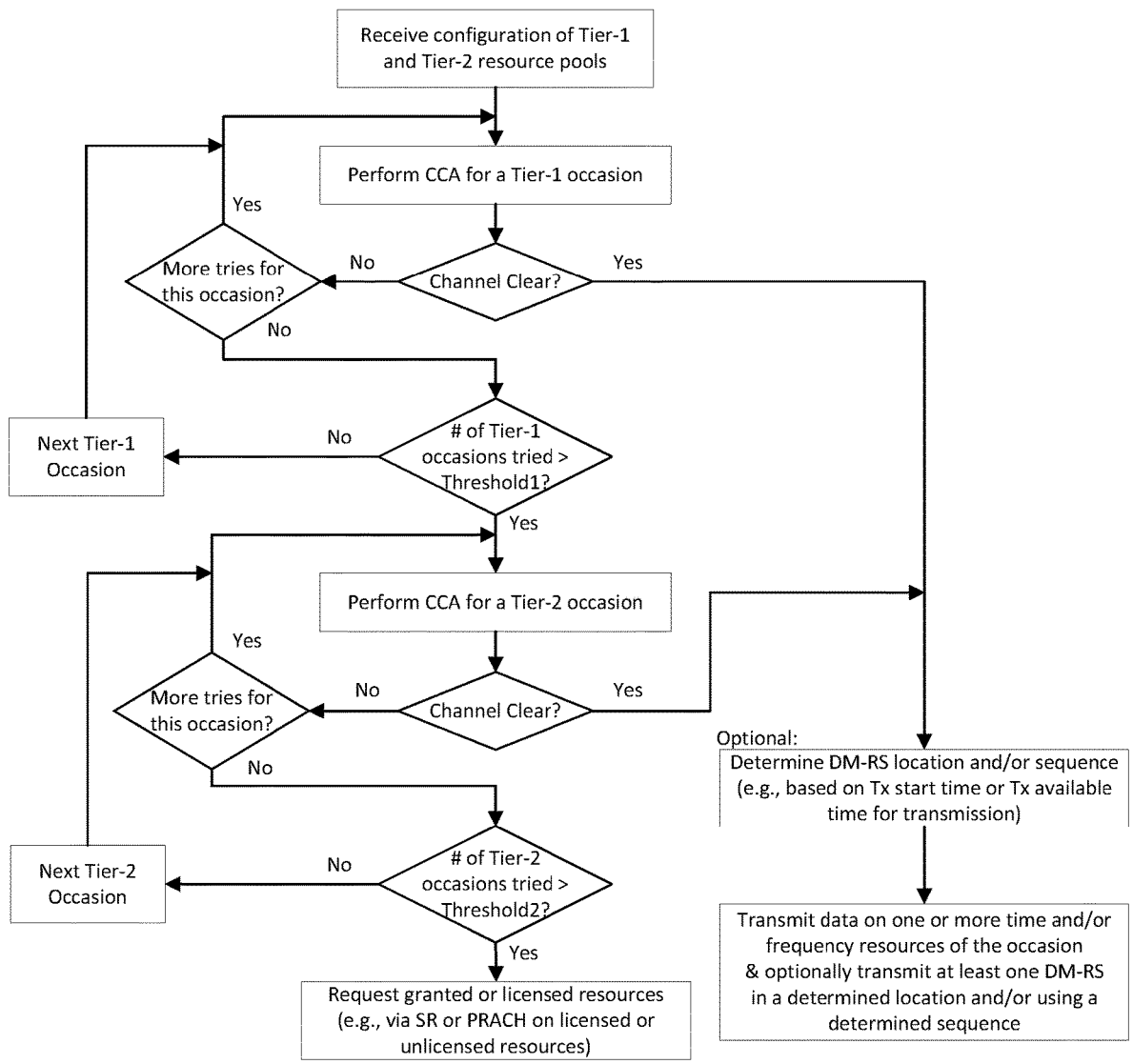
FIG. 6 is an example associated with resource pool tier selection and usage.

FIG. 6 is an example of resource pool tier selection and usage. A WTRU may (e.g., decide to) attempt to use a second resource pool tier, for example, when the WTRU may determine that it may have failed to find a channel to be clear for a number of occasions of a first resource pool tier. A WTRU may (e.g., decide to) request granted or licensed resources, for example, when the WTRU may determine that it may have failed to find a channel clear for a number of occasions of a second resource pool tier.

Unlicensed operation may be provided in a beam-based system. Resource pools may be provided in a beam-based system. In examples, one or more resource pools may be used to support multiple beams. A (e.g., each) resource pool may be associated with a beam or beam-pair link (BPL).

A (e.g., each) resource pool may be configured with an associated downlink signal that may be used, for example, to measure a quality of a beam. A measurement may, for example, be an RSRP measurement. A downlink signal that may be used for a beam quality measurement may include, for example, a beam discovery signal, a beam reference signal, a CSI-RS, an SS burst (e.g., an SS in an SS burst), and/or an SS block (e.g., an SS in an SS block).

A resource pool for a beam or a BPL may be configured in a periodic manner. In examples, a resource pool for a beam or a BPL may be present, available, used, configured, or determined, for example, every T1 cycle or periodically with a time period of T1.

A WTRU may be configured with one or more beams or BPLs for grant-free access. One or more resource pools for one or more beams or BPLs may be located, for example, in orthogonal time resources.

One or more SS blocks may be used in an SS burst. A (e.g., each) SS block may be associated with a beam. A (e.g., each) resource pool that may be associated with a beam may be located in a (e.g., the same) time resource with an SS block associated with the beam.

A WTRU may determine a resource pool that may be associated with a beam or a beam pair-link determined by the WTRU. In examples, a WTRU may measure beam qualities of SS blocks in an SS burst. A WTRU may determine the best or a preferred beam (e.g., SS block), for example, based on a beam quality measurement. Signaling (e.g., broadcast signaling) may provide an associated resource pool for a (e.g., each) beam. A WTRU may use a resource pool associated with a determined beam or BPL for grant-free access.

A WTRU may indicate to or otherwise inform a gNB a beam (e.g., SS block) determined for grant-free access. A gNB may confirm or configure a resource pool for a WTRU to use.

A gNB may provide, e.g., to a WTRU, a WTRU-ID (e.g., C-RNTI), for example, to use for grant-free access in a beam-specific resource pool.

A WTRU may try grant-free access in a resource pool. A WTRU may switch to another resource pool that may be associated with a different beam, for example, when the WTRU may fail to access a channel for the resource pool or may fail to successfully transmit using the resource pool (e.g., for a predefined or configured number of times (e.g., N times)). Failure to successfully transmit may include, for example, failing to receive confirmation (e.g., HARQ-ACK) from a gNB, e.g., in response to a transmission.

A CCA may be performed in a beam-based system. In examples, a WTRU may perform a CCA for one or more resource pools that may be associated with one or more beams or BPLs (e.g., determined beams or BPLs). A WTRU (e.g., when a WTRU may perform a CCA) may determine an Rx beam to use for performing the CCA, for example, based on the Rx beam the WTRU may have used for beam determination.

A WTRU may perform a CCA for a resource pool, for example, based on an Rx beam that may have been used when the WTRU determined a beam or BPL.

A WTRU may perform a CCA for a resource pool, for example, based on an (e.g., a best) Rx beam that may provide a highest RSRP. A best Rx beam may correspond to a Tx beam that a WTRU may use for transmission using a resource pool.

A WTRU may perform a CCA for one or more (e.g., all) Rx beams. An energy level a WTRU may use to determine channel occupation may, for example, be based on the highest energy measured or detected for a (e.g., any) Rx beam.

A WTRU may perform a CCA for one or more (e.g., all) Rx beams. An energy level a WTRU may use to determine a channel occupation may, for example, be based on an average of energy levels of one or more (e.g., all) Rx beams. Rx beam sweeping may be performed within a CCA duration (e.g., 4 us, 9 us, or 25 us). Rx beam sweeping may be performed across multiple CCA durations.

A WTRU may determine a channel to be clear, for example, after beam sweeping. A WTRU may perform a CCA (e.g., short CCA, such as a 25 us duration), for example, using an Rx beam that may correspond to a Tx beam on which the WTRU may (e.g., will) transmit just before transmission, e.g., to ensure a channel may be (e.g., is) clear in that direction before transmission. A WTRU may transmit, for example, when the WTRU may determine a channel to be clear. A WTRU may not transmit, for example, when the WTRU may determine a channel to not be clear.

Systems, methods and instrumentalities have been disclosed for transmission adaptation and grant-free access in an unlicensed band. Flexible transmission boundaries may be provided for transmission adaptation. Grant-free access resource pools may be provided. Unlicensed operation may be provided in a beam-based system, for example, using resource pools and or CCAs.

Features, elements and actions (e.g., processes and instrumentalities) are described by way of non-limiting examples. While examples may be directed to LTE, LTE-A, New Radio (NR) or 5 G protocols, subject matter herein is applicable to other wireless communications, systems, services and protocols. Each feature, element, action or other aspect of the described subject matter, whether presented in figures or description, may be implemented alone or in any combination, including with other subject matter, whether known or unknown, in any order, regardless of examples presented herein.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit receive (WTRU), the WTRU comprising:
a processor, configured at least to:
receive scheduling information for a set of resources associated with a time period, wherein the set of resources comprises a first resource and a second resource, wherein the first resource is associated with first start information and a first duration, and wherein the second resource is associated with second start information and a second duration;
determine that a channel is clear for transmission at a first time in the time period;
determine a resource from the set of resources based on the first time, the first start information, and the second start information, wherein the resource comprises one or more frequency resources; and
send an amount of data in a transmission using the determined resource, wherein the transmission comprises a demodulation reference signal (DM-RS), and wherein the amount of data is associated with a duration of the determined resource.

2. The WTRU of claim 1, wherein the DM-RS is placed at an end of the transmission.

3. The WTRU of claim 1, wherein a sequence associated with the DM-RS indicates the resource to a receiver.

4. The WTRU of claim 1, wherein the processor is further configured to map a modulation symbol to a resource element associated with the resource.

5. The WTRU of claim 1, wherein the DM-RS is placed at a beginning of the transmission.

6. The WTRU of claim 1, wherein the DM-RS indicates the resource.

7. The WTRU of claim 1, wherein,
if the determined resource is the first resource associated with the first duration, the amount of data is a first amount of data, and
if the determined resource is the second resource associated with the second duration, the amount of data is a second amount of data.

8. The WTRU of claim 1, wherein a position of the DM-RS in the transmission is associated with one or more of starting information associated with the determined resource or the duration of the determined resource, and wherein,
if the determined resource is the first resource, the starting information is the first starting information, and
if the determined resource is the second resource, the starting information is the second starting information.

9. The WTRU of claim 1, wherein the transmission comprises a number of additional DM-RSs, and wherein the number of additional DM-RSs is associated with the duration of the determined resource.

10. The WTRU of claim 1, wherein the channel is determined to be clear for transmission by performing a clear channel assessment (CCA) or listen before talk (LBT) on the channel.

11. A method comprising:
Receiving scheduling information for a set of resources associated with a time period, wherein the set of resources comprises a first resource and a second resource, wherein the first resource is associated with first start information and a first duration, and wherein the second resource is associated with second start information and a second duration;
determining that a channel is clear for transmission at a first time in the time period;
determining a resource from the set of resources based on the first time, the first start information, and the second start information, wherein the resource comprises one or more frequency resources; and
sending an amount of data in a transmission using the determined resource, wherein the transmission comprises a demodulation reference signal (DM-RS) and wherein the amount of data is associated with a duration of the determined resource.

12. The method of claim 11, wherein the DM-RS is placed at an end of the transmission.

13. The method of claim 11, wherein a sequence associated with the DM-RS indicates the resource to a receiver.

14. The method of claim 11, further comprising mapping a modulation symbol to a resource element associated with the resource.

15. The method of claim 11, wherein,
if the determined resource is the first resource associated with the first duration, the amount of data is a first amount of data, and
if the determined resource is the second resource associated with the second duration, the amount of data is a second amount of data.

16. The method of claim 11, wherein a position of the DM-RS in the transmission is associated with one or more of starting information associated with the determined resource or the duration of the determined resource, and wherein,
if the determined resource is the first resource, the starting information is the first starting information, and
if the determined resource is the second resource, the starting information is the second starting information.

17. The method of claim 11, wherein the transmission comprises a number of additional DM-RSs, and wherein the number of additional DM-RSs is associated with the duration of the determined resource.

18. The method of claim 11, wherein the channel is determined to be clear for transmission by performing a clear channel assessment (CCA) or listen before talk (LBT) on the channel.

* * * * *

UNITED STATES PATENT AND TRADEMARK OFFICE
CERTIFICATE OF CORRECTION

| | |
|---|---|
| PATENT NO. | : 11,452,132 B2 |
| APPLICATION NO. | : 16/610368 |
| DATED | : September 20, 2022 |
| INVENTOR(S) | : Janet Stern-Berkowitz et al. |

It is certified that error appears in the above-identified patent and that said Letters Patent is hereby corrected as shown below:

In the Claims

Claim 1: Column 38, Line 49 delete "A wireless transmit receive (WTRU)" and insert --A wireless transmit receive unit (WTRU)--.

Claim 11: Column 39, Line 39 delete "Receiving scheduling information for a set of resources" and insert --receiving scheduling information for a set of resources--.

Signed and Sealed this
Twenty-fifth Day of April, 2023

Katherine Kelly Vidal
*Director of the United States Patent and Trademark Office*